(12) United States Patent
Dong

(10) Patent No.: US 10,419,081 B2
(45) Date of Patent: Sep. 17, 2019

(54) INFORMATION TRANSMISSION METHOD, RADIO EQUIPMENT CONTROLLER, RADIO EQUIPMENT, AND BASE STATION

(71) Applicant: Huawei Technologies Co., Ltd., Shenzhen (CN)

(72) Inventor: Ping Dong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 168 days.

(21) Appl. No.: 15/606,369

(22) Filed: May 26, 2017

(65) Prior Publication Data

US 2017/0264344 A1 Sep. 14, 2017

Related U.S. Application Data

(63) Continuation of application No. PCT/CN2014/092419, filed on Nov. 28, 2014.

(51) Int. Cl.
| | |
|---|---|
| *H04W 4/00* | (2018.01) |
| *H04B 7/0404* | (2017.01) |
| *H04W 24/04* | (2009.01) |
| *H04W 88/08* | (2009.01) |
| *H04L 29/12* | (2006.01) |
| *H04Q 3/00* | (2006.01) |
| *H04W 92/12* | (2009.01) |

(52) U.S. Cl.
CPC .......... *H04B 7/0404* (2013.01); *H04L 61/20* (2013.01); *H04Q 3/0075* (2013.01); *H04W 24/04* (2013.01); *H04W 88/085* (2013.01); *H04W 92/12* (2013.01); *Y02D 70/00* (2018.01)

(58) Field of Classification Search
CPC .... H04B 7/0404; H04Q 3/0075; H04L 61/20; H04W 88/085; H04W 24/04; H04W 92/12; Y02D 70/00
USPC ......................................... 370/328, 329, 330
See application file for complete search history.

(56) References Cited

U.S. PATENT DOCUMENTS

| | | | | |
|---|---|---|---|---|
| 8,385,191 B2* | 2/2013 | Sakama | .............. | H04W 88/085 370/225 |
| 2008/0089689 A1* | 4/2008 | Sakama | .............. | H04W 88/085 398/115 |
| 2008/0129468 A1* | 6/2008 | Matsuoka | ........... | H02J 13/0024 375/259 |

(Continued)

FOREIGN PATENT DOCUMENTS

| | | |
|---|---|---|
| CN | 101064531 A | 10/2007 |
| CN | 101365188 A | 2/2009 |

(Continued)

OTHER PUBLICATIONS

Ericsson AB et al., "Common Public Radio Interface (CPRI); Interface Specification", CPRI Specification V6.1, Jul. 1, 2014, 129 pages.

*Primary Examiner* — Chuong T Ho
(74) *Attorney, Agent, or Firm* — Slater Matsil, LLP

(57) ABSTRACT

Embodiments of the present invention provide an information transmission method, a radio equipment controller, a radio equipment, and a base station. The method includes determining, by an REC, that a main line used for communication with a first radio equipment RE is faulty and determining, by the REC, a standby line used for communication with the first RE. The method also includes communicating with the first RE by using the standby line.

15 Claims, 9 Drawing Sheets

(56) References Cited

U.S. PATENT DOCUMENTS

| | | | | |
|---|---|---|---|---|
| 2010/0074121 A1* | 3/2010 | Sakama | ............... | H04W 24/00 |
| | | | | 370/248 |
| 2011/0032910 A1* | 2/2011 | Aarflot | ................. | H04J 3/0682 |
| | | | | 370/335 |
| 2012/0009977 A1 | 1/2012 | Yu et al. | | |
| 2015/0146613 A1* | 5/2015 | Shor | .................... | H04W 24/02 |
| | | | | 370/328 |
| 2016/0277964 A1* | 9/2016 | Xu | ...................... | H04W 28/065 |
| 2017/0012668 A1* | 1/2017 | Fang | ................. | H04W 88/085 |

FOREIGN PATENT DOCUMENTS

| | | |
|---|---|---|
| CN | 101547526 A | 9/2009 |
| CN | 101753244 A | 6/2010 |
| CN | 101841364 A | 9/2010 |
| CN | 101860802 A | 10/2010 |
| CN | 102611602 A | 7/2012 |
| CN | 102970701 A | 3/2013 |
| EP | 1912448 A2 | 4/2008 |
| EP | 3119122 A1 | 1/2017 |
| JP | 2008099137 A | 4/2008 |
| KR | 20120065054 A | 6/2012 |
| WO | 2008146394 A1 | 12/2008 |
| WO | 2010137117 A1 | 12/2010 |

\* cited by examiner

800

An REC determines that a main line used for communication with a first RE is faulty — S810

The REC determines a standby line used for communication with the first RE — S820

The REC communicates with the first RE by using the standby line — S830

900

A first RE receives, through a first port, an addressing request message sent by an REC, where the first port is an uplink CPRI port or a power cable port — S910

The first RE determines, according to the addressing request message, that an object that the addressing request message is specific to includes the first RE — S920

The first RE sends a first addressing response message to the REC through the first port — S930

A second RE receives, through a first port, an addressing request message sent by a radio equipment controller REC — S1100

Determine, according to the addressing request message, that an object that the addressing request message is specific to does not include the second RE — S1200

The second RE forwards the addressing request message through a power cable port and a downlink CPRI port when the first port is an uplink CPRI port — S1300

FIG. 16

INFORMATION TRANSMISSION METHOD, RADIO EQUIPMENT CONTROLLER, RADIO EQUIPMENT, AND BASE STATION

CROSS-REFERENCE TO RELATED APPLICATIONS

This application is a continuation of International Application No. PCT/CN2014/092419, filed on Nov. 28, 2014, the disclosure of which is hereby incorporated by reference in its entirety.

TECHNICAL FIELD

The present disclosure relates to the field of communications, and more particularly, to an information transmission method, a radio equipment controller, a radio equipment, and a base station.

BACKGROUND

A base station is divided into two parts: a radio equipment controller (REC) and a radio equipment (RE). The REC and the RE are generally connected in a cascaded manner by using an optical communications line. In this manner, once a fault occurs at any point in the communications line, the REC cannot communicate with any RE after the fault point, and manual onsite processing is required, which brings about a high onsite maintenance cost, increases a service interruption time, and affects user experience.

SUMMARY

Embodiments of the present invention provide an information transmission method, a radio equipment controller, a radio equipment, and a base station, which can reduce a site maintenance cost, reduce a service interruption event, and improve user experience.

According to a first aspect, a radio equipment controller (REC) is provided, including a first determining unit, configured to determine that a main line used by the REC to communicate with a first radio equipment RE is faulty and a second determining unit, configured to determine a standby line used by the REC to communicate with the first RE. The REC also includes a communications unit, configured to communicate with the first RE by using the standby line.

With reference to the first aspect, in a first possible implementation manner of the first aspect, the main line is a common public radio interface (CPRI) communications line; and the standby line is a power cable line, or is a power cable plus CPRI communications line.

With reference to the first possible implementation manner of the first aspect, in a second possible implementation manner of the first aspect, the first determining unit includes a first sending subunit, a first receiving subunit, and a first determining subunit, where the first sending subunit is configured to send an addressing request message specific to all controlled REs through a CPRI port or through a power cable port and a CPRI port; the first receiving subunit is configured to receive an addressing response message from at least one RE, where the at least one RE includes the first RE; and the first determining subunit is configured to: when it is determined that a path of at least one addressing response message received by the first receiving subunit from the first RE does not include the main line, determine that the main line used for communication with the first RE is faulty; and the second determining unit is specifically configured to: when the path of the at least one addressing response message received by the first receiving subunit from the first RE does not include the main line, determine, according to the path of the at least one addressing response message, the standby line used for communication with the first RE.

With reference to the second possible implementation manner of the first aspect, in a third possible implementation manner of the first aspect, the first sending subunit is specifically configured to: when an RE that belongs to a same power cable network as the REC exists in all the REs, send the addressing request message specific to all the REs through the CPRI port and the power cable port; or when an RE that belongs to a same power cable network as the REC does not exist in all the REs, send the addressing request message specific to all the REs through the CPRI port or through the CPRI port and the power cable port.

With reference to the second or the third possible implementation manner of the first aspect, in a fourth possible implementation manner of the first aspect, the second determining unit is specifically configured to: determine that a path of an addressing response message received by the receiving subunit the first time from the first RE is the standby line used for communication with the first RE.

With reference to the first possible implementation manner of the first aspect, in a fifth possible implementation manner of the first aspect, the second determining unit includes: a second sending subunit, configured to: after the first determining unit determines that the main line used by the REC to communicate with the first RE is faulty, send an addressing request message specific to the first RE through at least one of a power cable port and a CPRI port; a second receiving subunit, configured to receive at least one addressing response message from the first RE; and a second determining subunit, configured to determine, according to a path of the at least one addressing response message received by the second receiving subunit, the standby line used for communication with the first RE.

With reference to the fifth possible implementation manner of the first aspect, in a sixth possible implementation manner of the first aspect, the second sending subunit is specifically configured to: when the REC and the first RE belong to a same power cable network, send the addressing request message specific to the first RE through the power cable port or through the CPRI port and the power cable port; or when the REC and the first RE do not belong to a same power cable network, send the addressing request message specific to the first RE through the CPRI port or through the CPRI port and the power cable port.

With reference to the fifth or the sixth possible implementation manner of the first aspect, in a seventh possible implementation manner of the first aspect, the second determining subunit is specifically configured to: determine that a path of an addressing response message received by the second receiving subunit the first time from the first RE is the standby line used for communication with the first RE.

With reference to the first aspect or any possible implementation manner of the first possible implementation manner to the seventh possible implementation manner of the first aspect, in an eighth possible implementation manner of the first aspect, the communications unit is specifically configured to: send indication information to the first RE through the standby line, so as to reset or upgrade the first RE to recover the main line used by the REC to communicate with the first RE.

According to a second aspect, an RE is provided, including a receiving unit, configured to receive, through a first port, an addressing request message sent by a REC, where the first port is an uplink CPRI port or a power cable port and a determining unit, configured to determine, according to the addressing request message received by the receiving unit, that an object that the addressing request message is specific to includes the RE. The RE also includes a sending unit, configured to send a first addressing response message to the REC through the first port.

With reference to the second aspect, in a first possible implementation manner of the second aspect, the determining unit is further configured to determine, according to the addressing request message, that an object that the addressing request message is specific to further includes another RE; and the sending unit is further configured to forward the addressing request message through a downlink CPRI port and a power cable port when the first port is an uplink CPRI port.

With reference to the first possible implementation manner of the second aspect, in a second possible implementation manner of the second aspect, before the sending unit forwards the addressing request message through the downlink CPRI port and the power cable port, the sending unit is further configured to add information about a forwarding path at the RE to the addressing request message; and after the sending unit forwards the addressing request message through the downlink CPRI port and the power cable port, the receiving unit is further configured to receive a second addressing response message through the downlink CPRI port or through the power cable port, where the second addressing response message carries a message of the forwarding path at the RE; and the sending unit is further configured to forward the second addressing response message according to the information about the forwarding path at the RE.

With reference to the first possible implementation manner of the second aspect, in a third possible implementation manner of the second aspect, the receiving unit is further configured to receive a second addressing response message through the downlink CPRI port or the power cable port; and the sending unit is further configured to forward the second addressing response message through an uplink CPRI port.

With reference to the second aspect or any one of the foregoing possible implementation manners of the second aspect, in a fourth possible implementation manner of the second aspect, the addressing request message carries information about a forwarding path from the REC to the RE; and before the sending unit sends the first addressing response message to the REC through the first port, the sending unit is further configured to add, to the first addressing response message, the information about the forwarding path from the REC to the RE, so that the first addressing response message is returned to the REC according to a reverse path of the addressing request message.

According to a third aspect, a radio equipment RE is provided, where the RE includes: a receiving unit, configured to receive, through a first port, an addressing request message sent by a REC; a determining unit, configured to determine, according to the addressing request message, that an object that the addressing request message is specific to does not include the RE; and a sending unit, configured to forward the addressing request message through a power cable port and a downlink CPRI port when the first port is an uplink CPRI port.

With reference to the third aspect, in a first possible implementation manner of the third aspect, the sending unit is further configured to: discard the addressing request message when the first port is a power cable port.

With reference to the third aspect or the first possible implementation manner of the third aspect, in a second possible implementation manner of the third aspect, before the sending unit forwards the addressing request message through the power cable port and the downlink CPRI port, the sending unit is further configured to add information about a forwarding path at the RE to the addressing request message; after the sending unit forwards the addressing request message through the power cable port and the downlink CPRI port, the receiving unit is further configured to receive an addressing response message through the downlink CPRI port or the power cable port, where the addressing response message carries the information about the forwarding path at the RE; and the sending unit is further configured to forward the addressing response message according to the information about the forwarding path at the RE.

With reference to the third aspect or the first possible implementation manner of the third aspect, in a third possible implementation manner of the third aspect, after the sending unit forwards the addressing request message through the power cable port and the downlink CPRI port, the receiving unit is further configured to receive an addressing response message through the downlink CPRI port or the power cable port; and the sending unit is further configured to forward the addressing response message through an uplink CPRI port.

According to a fourth aspect, an REC is provided, including a memory, a processor, and a transceiver, where the memory stores program code, and the processor invokes the program code in the memory to perform the following processing: determining that a main line used by the REC to communicate with a first radio equipment RE is faulty; determining a standby line used by the REC to communicate with the first RE; and communicating, by controlling the transceiver, with the first RE by using the standby line.

With reference to the fourth aspect, in a first possible implementation manner of the fourth aspect, the main line is a CPRI communications line; and the standby line is a power cable line, or is a power cable plus CPRI communications line.

With reference to the first possible implementation manner of the fourth aspect, in a second possible implementation manner of the fourth aspect, the processor invokes the program code in the memory to specifically perform the following processing: controlling the transceiver to send, through a CPRI port or through a power cable port and a CPRI port, an addressing request message specific to all controlled REs; controlling the transceiver to receive an addressing response message from at least one RE, where the at least one RE includes the first RE; when a path of at least one addressing response message from the first RE does not include the main line, the main line used for communication with the first RE being faulty; and when the path of the at least one addressing response message from the first RE does not include the main line, determining, according to the path of the at least one addressing response message, the standby line used for communication with the first RE.

With reference to the second possible implementation manner of the fourth aspect, in a third possible implementation manner of the fourth aspect, the processor invokes the program code in the memory to specifically perform the following processing: when an RE that belongs to a same power cable network as the REC exists in all the REs, controlling the transceiver to send, through the CPRI port and the power cable port, the addressing request message specific to all the REs; or when an RE that belongs to a same power cable network as the REC does not exist in all the REs, controlling the transceiver to send, through the CPRI port or through the CPRI port and the power cable port, the addressing request message specific to all the REs.

With reference to the second or the third possible implementation manner of the fourth aspect, in a fourth possible implementation manner of the fourth aspect, the processor invokes the program code in the memory to specifically perform the following processing: determining that a path of an addressing response message received the first time from the first RE is the standby line used for communication with the first RE.

With reference to the first possible implementation manner of the fourth aspect, in a fifth possible implementation manner of the fourth aspect, the processor invokes the program code in the memory to specifically perform the following processing: after it is determined that the main line used for communication with the first RE is faulty, controlling the transceiver to send, through at least one of a power cable port and a CPRI port, an addressing request message specific to the first RE; controlling the transceiver to receive at least one addressing response message from the first RE; and determining, according to a path of the at least one addressing response message, the standby line used for communication with the first RE.

With reference to the fifth possible implementation manner of the fourth aspect, in a sixth possible implementation manner of the fourth aspect, the processor invokes the program code in the memory to specifically perform the following processing: when the REC and the first RE belong to a same power cable network, controlling the transceiver to send, through the power cable port or through the CPRI port and the power cable port, the addressing request message specific to the first RE; or when the REC and the first RE do not belong to a same power cable network, controlling the transceiver to send, through the CPRI port or through the CPRI port and the power cable port, the addressing request message specific to the first RE.

With reference to the fifth or the sixth possible implementation manner of the fourth aspect, in a seventh possible implementation manner of the fourth aspect, the processor invokes the program code in the memory to specifically perform the following processing: determining that a path of an addressing response message received the first time from the first RE is the standby line used for communication with the first RE.

With reference to the fourth aspect or any one of the foregoing possible implementation manners of the fourth aspect, in an eighth possible implementation manner of the fourth aspect, the processor invokes the program code in the memory to specifically perform the following processing: sending indication information to the first RE through the standby line, so as to reset or upgrade the first RE to recover the main line used by the REC to communicate with the first RE.

According to a fifth aspect, an RE is provided, including a memory, a processor, and a transceiver, where the memory stores program code, and the processor invokes the program code in the memory to perform the following processing: controlling the transceiver to receive, through a first port, an addressing request message sent by a REC, where the first port is an uplink CPRI port or a power cable port; determining, according to the addressing request message, that an object that the addressing request message is specific to includes the RE; and controlling the transceiver to send, through the first port, a first addressing response message to the REC.

With reference to the fifth aspect, in a first possible implementation manner of the fifth aspect, the processor invokes the program code in the memory to further perform the following processing: determining, according to the addressing request message, that the object that the addressing request message is specific to further includes another RE; and when the first port is an uplink CPRI port, controlling the transceiver to forward, through a downlink CPRI port and a power cable port, the addressing request message.

With reference to the first possible implementation manner of the fifth aspect, in a second possible implementation manner of the fifth aspect, before the transceiver is controlled to forward, through the downlink CPRI port and the power cable port, the addressing request message, the processor invokes the program code in the memory to further perform the following processing: adding information about a forwarding path at the RE to the addressing request message; and after the transceiver is controlled to forward, through the downlink CPRI port and the power cable port, the addressing request message, the processor invokes the program code in the memory to further perform the following processing: controlling the transceiver to receive, through the downlink CPRI port or through the power cable port, a second addressing response message, where the second addressing response message carries a message of the forwarding path at the RE; and forwarding the second addressing response message according to the information about the forwarding path at the RE.

With reference to the first possible implementation manner of the fifth aspect, in a third possible implementation manner of the fifth aspect, the processor invokes the program code in the memory to further perform the following processing: controlling the transceiver to receive, through the downlink CPRI port or the power cable port, a second addressing response message; and controlling the transceiver to forward, through an uplink CPRI port, the second addressing response message.

With reference to the fifth aspect or any one of the foregoing possible implementation manners of the fifth aspect, in a fourth possible implementation manner of the fifth aspect, the addressing request message carries information about a forwarding path from the REC to the RE; and before the transceiver is controlled to send, through the first port, the first addressing response message to the REC, the processor invokes the program code in the memory to further perform the following processing: adding, to the first addressing response message, the information about the forwarding path from the REC to the RE, so that the first addressing response message is returned to the REC according to a reverse path of the addressing request message.

According to a sixth aspect, an RE is provided, including a memory, a processor, and a transceiver, where the memory stores program code, and the processor invokes the program code in the memory to perform the following processing: controlling the transceiver to receive, through a first port, an addressing request message sent by a REC; determining, according to the addressing request message, that an object that the addressing request message is specific to does not include the RE; and when the first port is an uplink CPRI port, controlling the transceiver to forward, through a power cable port and a downlink CPRI port, the addressing request message.

With reference to the sixth aspect, in a first possible implementation manner of the sixth aspect, the processor invokes the program code in the memory to further perform the following processing: discarding the addressing request message when the first port is a power cable port.

With reference to the sixth aspect or the first possible implementation manner of the sixth aspect, in a second possible implementation manner of the sixth aspect, before the transceiver is controlled to forward, through the power cable port and the downlink CPRI port, the addressing request message, the processor invokes the program code in the memory to further perform the following processing: adding information about a forwarding path at the RE to the addressing request message; and after the transceiver is controlled to forward, through the power cable port and the downlink CPRI port, the addressing request message, the processor invokes the program code in the memory to further perform the following processing: controlling the transceiver to receive, through the downlink CPRI port or the power cable port, an addressing response message, where the addressing response message carries the information about the forwarding path at the RE; and forwarding the addressing response message according to the information about the forwarding path at the RE.

With reference to the sixth aspect or the first possible implementation manner of the sixth aspect, in a third possible implementation manner of the sixth aspect, after the transceiver is controlled to forward, through the power cable port and the downlink CPRI port, the addressing request message, the processor invokes the program code in the memory to further perform the following processing: controlling the transceiver to receive, through the downlink CPRI port or the power cable port, an addressing response message; and controlling the transceiver to forward, through an uplink CPRI port, the addressing response message.

According to a seventh aspect, a base station is provided, including a REC and at least one radio equipment RE, where the REC communicates with each RE in the at least one RE through a main line; when a main line used by the REC to communicate with any RE in the at least one RE is faulty, the REC determines a standby line used for communication with the any RE whose main line is faulty; and the REC communicates, by using the standby line, with the any RE whose main line is faulty.

With reference to the seventh aspect, in a first possible implementation manner of the seventh aspect, the main line is a CPRI communications line; and the standby line is a power cable line, or is a power cable plus CPRI communications line.

With reference to the first possible implementation manner of the seventh aspect, in a second possible implementation manner of the seventh aspect, the REC sends an addressing request message specific to all controlled REs through a CPRI port or through a power cable port and a CPRI port; after receiving the addressing request message through a first port, each RE sends an addressing response message through the first port, where the first port is an uplink CPRI port or a power cable port; the REC determines, according to whether a path of the addressing response message sent by each RE includes the main line, the RE whose main line is faulty; the REC determines, according to a path of at least one addressing response message sent by the RE whose main line is faulty, the standby line used for communication with the RE whose main line is faulty.

With reference to the second possible implementation manner of the seventh aspect, in a third possible implementation manner of the seventh aspect, after each RE receives the addressing request message, and when the first port is an uplink CPRI port, each RE forwards the addressing request message through a downlink CPRI port and a power cable port.

With reference to the third possible implementation manner of the seventh aspect, in a fourth possible implementation manner of the seventh aspect, when each RE in the REC receives, through the downlink CPRI port or through the power cable port, an addressing response message sent by another RE, each RE in the REC forwards, through an uplink CPRI port, the addressing response message sent by the another RE.

With reference to the third possible implementation manner of the seventh aspect, in a sixth possible implementation manner of the seventh aspect, when each RE forwards the addressing request message through the downlink CPRI port and the power cable port, each RE adds information about a forwarding path to the addressing request message, so that an addressing response message corresponding to the addressing request message is returned to the REC according to a reverse path of the addressing request message.

With reference to any one of the second to the fifth possible implementation manners of the seventh aspect, in a sixth possible implementation manner of the seventh aspect, the sending, by the REC, an addressing request message specific to all controlled REs through a CPRI port or through a power cable port and a CPRI port includes: when an RE that belongs to a same power cable network as the REC exists in all the REs, sending, by the REC, the addressing request message specific to all the REs through the CPRI port and the power cable port; or when an RE that belongs to a same power cable network as the REC does not exist in all the REs, sending, by the REC, the addressing request message specific to all the REs through the CPRI port or through the CPRI port and the power cable port.

With reference to any one of the second to the sixth possible implementation manners of the seventh aspect, in a seventh possible implementation manner of the seventh aspect, the determining, by the REC, according to a path of at least one addressing response message sent by the RE whose main line is faulty, the standby line used for communication with the RE whose main line is faulty includes: determining, by the REC, that a path of an addressing response message received the first time from the RE whose main line is faulty is the standby line used for communication with the RE whose main line is faulty.

With reference to the first possible implementation manner of the seventh aspect, in an eighth possible implementation manner of the seventh aspect, when the REC determines that the main line used for communication with the first RE is faulty, the REC sends an addressing request message specific to the first RE through at least one of a power cable port and a CPRI port; the first RE receives the addressing request message through a first port, and sends an addressing response message through the first port, where the first port is an uplink CPRI port or a power cable port; and the REC determines, according to a path of at least one addressing response message sent by the first RE, the standby line used for communication with the first RE.

With reference to the eighth possible implementation manner of the seventh aspect, in a ninth possible implementation manner of the seventh aspect, before the first RE receives the addressing request message through the first port, and when an upstream RE of the first RE receives the addressing request message through an uplink CPRI port, the upstream RE of the first RE forwards the addressing request message through the downlink CPRI port and the power cable port.

With reference to the ninth possible implementation manner of the seventh aspect, in a tenth possible implementation manner of the seventh aspect, before the upstream RE of the first RE forwards the addressing request message through the downlink CPRI port and the power cable port, the upstream RE of the first RE adds a message of a forwarding path at the upstream RE to the addressing request message; before the first RE sends the addressing response message through the first port, the first RE adds the message of the forwarding path to the addressing response message; and after the upstream RE of the first RE receives the addressing response message, the upstream RE of the first RE forwards the addressing response message according to the message of the forwarding path in the addressing response message, so that the addressing response message is returned to the REC according to a reverse path of the corresponding addressing request message.

With reference to the eighth or the ninth possible implementation manner of the seventh aspect, in an eleventh possible implementation manner of the seventh aspect, the upstream RE of the first RE receives the addressing response message through the downlink CPRI port or the power cable port, and forwards the addressing response message through the uplink CPRI port.

With reference to any one of the eighth to the eleventh possible implementation manners of the seventh aspect, in a twelfth possible implementation manner of the seventh aspect, the upstream RE of the first RE discards the addressing request message when receiving the addressing request message through the power cable port.

With reference to any one of the eighth to the twelfth possible implementation manners of the seventh aspect, in a thirteenth possible implementation manner of the seventh aspect, the sending, by the REC, an addressing request message specific to the first RE through at least one of a power cable port and a CPRI port includes: when the REC and the first RE belong to a same power cable network, sending, by the REC, the addressing request message specific to the first RE through the power cable port or through the CPRI port and the power cable port; or when the REC and the first RE do not belong to a same power cable network, sending, by the REC, the addressing request message specific to the first RE through the CPRI port or through the CPRI port and the power cable port.

With reference to the seventh aspect or any one of the foregoing possible implementation manners of the seventh aspect, in a fourteenth possible implementation manner of the seventh aspect, the communicating, by the REC by using the standby line, with the any RE whose main line is faulty includes: sending, by the REC through the standby line, indication information to the any RE whose main line is faulty, so as to reset or upgrade the any RE whose main line is faulty to recover the main line of the any RE whose main line is faulty.

According to an eighth aspect, an information transmission method is provided, including: determining, by a REC, that a main line used for communication with a first radio equipment RE is faulty; determining, by the REC, a standby line used for communication with the first RE; and communicating, by the REC, with the first RE by using the standby line.

With reference to the eighth aspect, in a first possible implementation manner of the eighth aspect, the main line is a CPRI communications line; and the standby line is a power cable line, or is a power cable plus CPRI communications line.

With reference to the first possible implementation manner of the eighth aspect, in a second possible implementation manner of the eighth aspect, the determining, by an REC, that a main line used for communication with first RE is faulty includes: sending, by the REC, an addressing request message specific to all controlled REs through a CPRI port or through a power cable port and a CPRI port; receiving, by the REC, an addressing response message from at least one RE, where the at least one RE includes the first RE; and when a path of at least one addressing response message from the first RE does not include the main line, determining, by the REC, that the main line used for communication with the first RE is faulty; and the determining, by the REC, a standby line used for communication with the first RE includes: when the path of the at least one addressing response message from the first RE does not include the main line, determining, by the REC according to the path of the at least one addressing response message, the standby line used for communication with the first RE.

With reference to the second possible implementation manner of the eighth aspect, in a third possible implementation manner of the eighth aspect, the sending, by the REC, an addressing request message specific to all controlled REs through a CPRI port or through a power cable port and a CPRI port includes: when an RE that belongs to a same power cable network as the REC exists in all the REs, sending, by the REC, the addressing request message specific to all the REs through the CPRI port and the power cable port; or when an RE that belongs to a same power cable network as the REC does not exist in all the REs, sending, by the REC, the addressing request message specific to all the REs through the CPRI port or through the CPRI port and the power cable port.

With reference to the second or the third possible implementation manner of the eighth aspect, in a fourth possible implementation manner of the eighth aspect, the determining, by the REC, a standby line used for communication with the first RE includes: determining, by the REC, that a path of an addressing response message received the first time from the first RE is the standby line used for communication with the first RE.

With reference to the first possible implementation manner of the eighth aspect, in a fifth possible implementation manner of the eighth aspect, the determining, by the REC, a standby line used for communication with the first RE includes: after the REC determines that the main line used for communication with the first RE is faulty, sending, by the REC, an addressing request message specific to the first RE through at least one of a power cable port and a CPRI port; receiving, by the REC, at least one addressing response message from the first RE; and determining, by the REC according to a path of the at least one addressing response message, the standby line used for communication with the first RE.

With reference to the fifth possible implementation manner of the eighth aspect, in a sixth possible implementation manner of the eighth aspect, the sending, by the REC, an addressing request message specific to the first RE through at least one of a power cable port and a CPRI port includes: when the REC and the first RE belong to a same power cable network, sending, by the REC, the addressing request message specific to the first RE through the power cable port or through the CPRI port and the power cable port; or when the REC and the first RE do not belong to a same power cable network, sending, by the REC, the addressing request message specific to the first RE through the CPRI port or through the CPRI port and the power cable port.

With reference to the fifth or the sixth possible implementation manner of the eighth aspect, in a seventh possible implementation manner of the eighth aspect, the determining, by the REC, a standby line used for communication with the first RE includes: determining, by the REC, that a path of an addressing response message received the first time from the first RE is the standby line used for communication with the first RE.

With reference to the eighth aspect or any one of the foregoing possible implementation manners of the eighth aspect, in an eighth possible implementation manner of the eighth aspect, the communicating, by the REC, with the first RE by using the standby line includes: sending, by the REC, indication information to the first RE through the standby line, so as to reset or upgrade the first RE to recover the main line used by the REC to communicate with the first RE.

According to a ninth aspect, an information transmission method is provided, including: receiving, by a first radio equipment RE through a first port, an addressing request message sent by a REC, where the first port is an uplink CPRI port or a power cable port; determining, by the first RE according to the addressing request message, that an object that the addressing request message is specific to includes the first RE; and sending, by the first RE, a first addressing response message to the REC through the first port.

With reference to the ninth aspect, in a first possible implementation manner of the ninth aspect, the method further includes: determining, by the first RE according to the addressing request message, that the object that the addressing request message is specific to further includes another RE; and when the first port is an uplink CPRI port, forwarding, by the first RE, the addressing request message through a downlink CPRI port and a power cable port.

With reference to the first possible implementation manner of the ninth aspect, in a second possible implementation manner of the ninth aspect, before the forwarding the addressing request message through a downlink CPRI port and a power cable port, the method further includes: adding information about a forwarding path at the first RE to the addressing request message; and after the forwarding the addressing request message through a downlink CPRI port and a power cable port, the method further includes: receiving, by the first RE, a second addressing response message through the downlink CPRI port or through the power cable port, where the second addressing response message carries a message of the forwarding path at the first RE; and forwarding the second addressing response message according to the information about the forwarding path at the first RE.

With reference to the first possible implementation manner of the ninth aspect, in a third possible implementation manner of the ninth aspect, the method further includes: receiving, by the first RE, a second addressing response message through the downlink CPRI port or the power cable port; and forwarding, by the first RE, the second addressing response message through an uplink CPRI port.

With reference to the ninth aspect or any one of the foregoing possible implementation manners of the ninth aspect, in a fourth possible implementation manner of the ninth aspect, the addressing request message carries information about a forwarding path from the REC to the first RE; and before the sending a first addressing response message to the REC through the first port, the method further includes: adding, by the first RE to the first addressing response message, the information about the forwarding path from the REC to the first RE, so that the first addressing response message is returned to the REC according to a reverse path of the addressing request message.

According to a tenth aspect, an information transmission method is provided, where the method includes: receiving, by a second radio equipment RE through a first port, an addressing request message sent by a REC; determining, according to the addressing request message, that an object that the addressing request message is specific to does not include the second RE; and forwarding, by the second RE, the addressing request message through a power cable port and a downlink CPRI port when the first port is an uplink CPRI port.

With reference to the tenth aspect, in a first possible implementation manner of the tenth aspect, the method further includes: discarding, by the second RE, the addressing request message when the first port is a power cable port.

With reference to the tenth aspect or the first possible implementation manner of the tenth aspect, in a second possible implementation manner of the tenth aspect, before the forwarding, by the second RE, the addressing request message through a power cable port and a downlink CPRI port, the method further includes: adding information about a forwarding path at the second RE to the addressing request message; and after the forwarding, by the second RE, the addressing request message through a power cable port and a downlink CPRI port, the method further includes: receiving, by the second RE, an addressing response message through the downlink CPRI port or the power cable port, where the addressing response message carries the information about the forwarding path at the second RE; and forwarding, by the second RE, the addressing response message according to the information about the forwarding path at the second RE.

With reference to the tenth aspect or the first possible implementation manner of the tenth aspect, in a third possible implementation manner of the tenth aspect, after the forwarding, by the second RE, the addressing request message through a power cable port and a downlink CPRI port, the method further includes: receiving, by the second RE, an addressing response message through the downlink CPRI port or the power cable port; and forwarding, by the second RE, the addressing response message through the uplink CPRI port.

Therefore, in the embodiments of the present invention, when an REC determines that a main line used for communication with any RE is faulty, the REC may determine a standby line used for communication with the RE whose main line is faulty, and communicate, by using the standby line, with the RE whose main line is faulty; therefore, when the main line is faulty, manual onsite processing is not required, a maintenance cost is reduced, and a service interruption time is reduced, thereby improving user experience.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 15 is a schematic flowchart of an information transmission method according to another embodiment of the present invention; and FIG. 16 is a schematic flowchart of an information transmission method according to another embodiment of the present invention.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present embodiments.

The technical solutions of the present embodiments are applicable to various communication systems, such as a global system for mobile communications (GSM), a code division multiple access (CDMA) system, Wideband Code Division Multiple Access (WCDMA), a general packet radio service (GPRS), and long term evolution (LTE).

A base station may be a base station (BTS) in GSM or CDMA, may be a base station (NodeB) in WCDMA, or may be an evolved base station (eNB or e-NodeB, evolutional NodeB) in long term evolution (LTE), which is not limited in the present embodiments. However, for ease of description, the following embodiments use the NodeB as an example for description.

Figure 1:
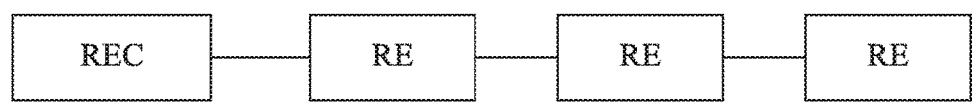
FIG. 1 is a schematic block diagram of a base station according to an embodiment of the present invention.

In the prior art, a radio equipment controller (REC) is connected to a radio equipment (RE) in a cascading manner by using a common public radio interface (CPRI) communications line, that is, a connection manner shown in FIG. 1, and in this manner, once a communication fault occurs in any node, it may cause that the REC cannot communicate with any RE after this fault point. Therefore, embodiments of the present invention provide a base station, an REC, an RE, and an information transmission method, and for ease of understanding, detailed descriptions are provided below with reference to FIG. 2 to FIG. 16.

Figure 2:
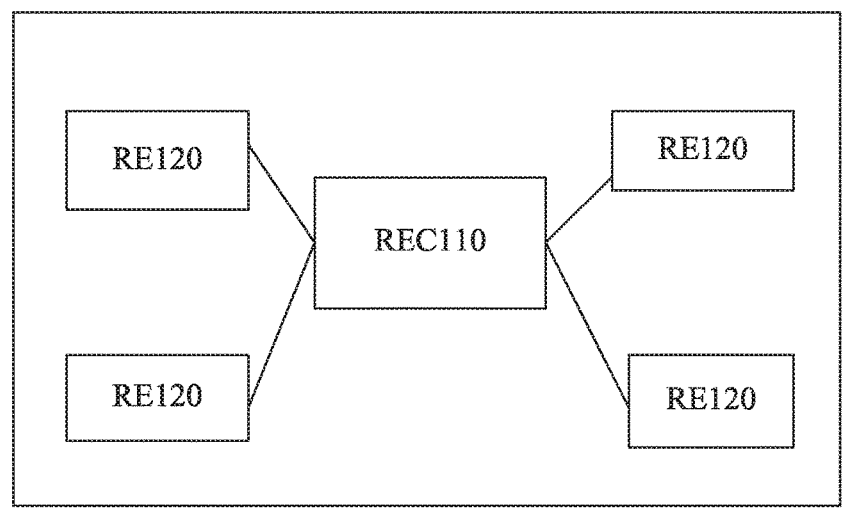
FIG. 2 is a schematic diagram of a manner of connection between a radio equipment controller (REC) and a radio equipment (RE) in the prior art.

FIG. 2 is a schematic block diagram of a base station 100 according to an embodiment of the present invention. As shown in FIG. 2, the base station 100 includes an REC 110 and at least one RE 120 (in FIG. 2, an example in which there are 4 REs is used, and certainly, it is not limited herein).

The REC 110 communicates with each RE 120 in the at least one RE 120 by using a main line.

When a main line used by the REC 110 to communicate with any RE 120 in the at least one RE 120 is faulty, the REC 110 determines a standby line used for communication with the any RE 120 whose main line is faulty.

The REC 110 communicates, by using the standby line, with the any RE 120 whose main line is faulty.

Therefore, in this embodiment of the present invention, when an REC determines that a main line used for communication with any RE is faulty, the REC may determine a standby line used for communication with the RE whose main line is faulty, and communicate, by using the standby line, with the RE whose main line is faulty; therefore, when the main line is faulty, manual onsite processing is not required, a maintenance cost is reduced, and a service interruption time is reduced, thereby improving user experience.

It should be understood that, although in FIG. 1, the REC 110 is directly connected to each RE 120, it only exemplarily indicates that the REC 110 may communicate with each RE 120; and it does not mean that the REC 110 must be directly connected to each RE 120, for example, the REC 110 may be connected to another RE 120 through one RE 120.

In this embodiment of the present invention, the REC may be also referred to as a baseband processing unit (BBU), and the RE may be also referred to as a radio remote unit (RRU).

In this embodiment of the present invention, the main line may be a CPRI communications line; and the standby line may be a power cable line, or be a power cable plus CPRI communications line. Certainly, the main line may be a power cable line, or be a power cable plus CPRI communications line; and the standby line is a CPRI communications line, or is in another manner, which may be specifically determined according to an application scenario, and are not limited by this embodiment of the present invention. However, in this embodiment of the present invention, that the main line is a CPRI communications line, and the standby line is a power cable line, or is a power cable plus CPRI communications line is mainly used for description.

Because the REC and the RE are necessarily powered by a power cable network, in this embodiment of the present invention, when a fault occurs in the CPRI communications line between the REC and the RE, communication between the REC and the RE is implemented by using the power cable network of the REC and the RE.

In this embodiment of the present invention, the CPRI communications line refers to a line supporting the CPRI protocol; and the CPRI communications line may include at least one of an optical fiber, a coaxial cable, and an Ethernet cable.

In this embodiment of the present invention, the communicating, by the REC by using the standby line, with the any RE whose main line is faulty may include: resetting or upgrading, by the REC by using the standby line, the RE whose main line is faulty, to recover the main line of the RE whose main line is faulty.

For example, a cause of a fault of a main line of an RE is that an optical port parameter of the RE is improper; therefore, the optical port parameter of the RE may be modified by sending indication information through the standby line, so that to recover the main line.

For another example, a problem occurs in hardware of the RE; as a result, the RE cannot be normally started, and can only be recovered by performing power-off and then power-on. Because, in this case, a problem already occurs in the RE, communication with the RE cannot be successfully performed by using the CPRI communications line. Therefore, the REC may determine the standby line, where the standby line may include a power cable; and the REC may send indication information to the RE through the standby line, to instruct the RE to perform power-on and power-off.

In this embodiment of the present invention, the REC may scan all controlled REs in real time (for example, periodically or at an initialization phase), determine, in all the REs, an RE whose main line is faulty, and determine the standby line of the RE whose main line is faulty; and the REC may also determine, by exchanging a heartbeat message with an RE, that a main line used for communication with the RE is faulty, and then, determine a standby line used for communication with the RE. For ease of understanding, the two cases are separately described in detail below with reference to Embodiment A and Embodiment B.

Embodiment A

In this embodiment, the REC may scan all the controlled REs in real time, determine, in all the REs, the RE whose main line is faulty, and determine the standby line of the RE whose main line is faulty.

Optionally, the REC sends an addressing request message specific to all the controlled REs through a CPRI port or through a power cable port and a CPRI port; after receiving the addressing request message through a first port, each RE sends an addressing response message through the first port, where the first port is an uplink CPRI port or a power cable port; the REC determines, according to whether a path of the addressing response message sent by each RE includes the main line, the RE whose main line is faulty; and the REC determines, according to a path of at least one addressing response message sent by the RE whose main line is faulty, the standby line used for communication with the RE whose main line is faulty.

Optionally, after each RE receives the addressing request message, and when the first port is an uplink CPRI port, each RE forwards the addressing request message through a downlink CPRI port and a power cable port.

Figure 3:
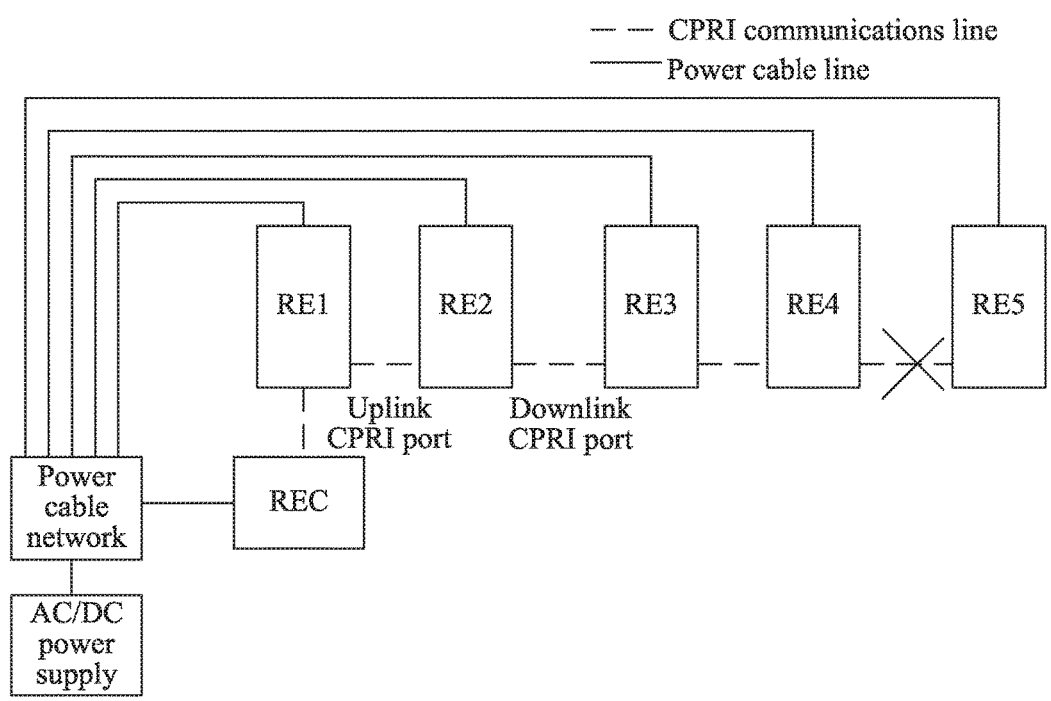
FIG. 3 is a schematic diagram of an application scenario according to another embodiment of the present invention.

In this embodiment of the present invention, a CPRI port of an RE includes an uplink CPRI port and a downlink CPRI port, where the uplink CPRI port refers to a CPRI port close to the REC, and the downlink CPRI port refers to a CPRI port far away from the REC; reference may be specifically made to labels in FIG. 3; and the foregoing explanation is applicable to all embodiments of the present invention.

Optionally, when each RE in the REC receives, through the downlink CPRI port or through the power cable port, an addressing response message sent by another RE, each RE in the REC forwards, through an uplink CPRI port, the addressing response message sent by the another RE.

Optionally, when each RE forwards the addressing request message through the downlink CPRI port and the power cable port, each RE adds information about a forwarding path to the addressing request message, so that an addressing response message corresponding to the addressing request message is returned to the REC according to a reverse path of the addressing request message.

Optionally, when an RE that belongs to a same power cable network as the REC exists in all the REs, the REC sends the addressing request message specific to all the REs through the CPRI port and the power cable port; or when an RE that belongs to a same power cable network as the REC does not exist in all the RECs, the REC sends the addressing request message specific to all the REs through the CPRI port or through the CPRI port and the power cable port.

Optionally, the REC determines that a path of an addressing response message received the first time from the RE whose main line is faulty is the standby line used for communication with the RE whose main line is faulty.

For ease of understanding, how to determine the RE whose main line is faulty and how to determine the standby line used for communication with the RE whose main line is faulty in Embodiment A are described in detail below with reference to FIG. 3 to FIG. 5.

In FIG. 3, an REC, an RE 1, an RE 2, an RE 3, an RE 4, and an RE 5 belong to a same power cable network; and it is assumed that a CPRI communications line from the RE 4 to the RE 5 is faulty, for example, the CPRI communications line from the RE 4 to the RE 5 is faulty due to a hardware fault of the RE 5 or an improper optical port parameter of the RE 5.

The REC sends an addressing request message through a power cable port and a CPRI port, where the addressing request message is specific to all the REs. The addressing request message sent by the REC may arrive at the RE 1 through a CPRI communications line, and separately arrive at the RE 1, the RE 2, the RE 3, the RE 4, and the RE 5 through a power cable.

For each RE, processing on the addressing request message may meet the following principles: if the addressing request message is received at an uplink CPRI port, the addressing request message is forwarded through the power cable port and a downlink CPRI port, and an addressing response message is returned to the uplink CPRI port; and if the addressing request message is received at the power cable port, an addressing response message is returned at the power cable port, and the addressing request message is no longer forwarded.

For example, for the RE 1, if the RE 1 receives the addressing request message through the uplink CPRI port, the RE 1 may return an addressing response message to the REC through the uplink CPRI port, and forward the addressing request message through the downlink CPRI port and the power cable port; and if the RE 1 receives the addressing request message through the power cable port, the RE 1 may send the addressing response message through the power cable port, and perform no forwarding.

For example, for the RE 2, if the RE 2 receives, through the uplink CPRI port, the addressing request message forwarded by the RE 1, the RE 2 may return an addressing response message to the REC through the uplink CPRI port, and forward the addressing request message through the downlink CPRI port and the power cable port; and if the RE 2 receives the addressing request message through the power cable port, the RE 2 may return the addressing response message to the REC through the power cable port, and perform no forwarding.

For example, for the RE 3, if the RE 3 receives, through the uplink CPRI port, the addressing request message forwarded by the RE 2, the RE 3 may return an addressing response message through the uplink CPRI port, and forward the addressing request message through the downlink CPRI port and the power cable port; and if the RE 3 receives the addressing request message through the power cable port, the RE 3 may return the addressing response message to the REC through the power cable port, and perform no forwarding.

For example, for the RE 4, if the RE 4 receives, through the uplink CPRI port, the addressing request message forwarded by the RE 3, the RE 4 may return an addressing response message to the REC through the uplink CPRI port, and forward the addressing request message through the downlink CPRI port and the power cable port; and if the RE 4 receives the addressing request message through the power cable port, the RE 4 may return the addressing response message to the REC through the power cable port, and perform no forwarding.

For example, for the RE 5, because the CPRI line between the RE 4 and the RE 5 is faulty, the RE 5 receives, the addressing request directly from the REC only through the power cable port, and the addressing request message that is forwarded by the RE 1, the RE 2, the RE 3, and the RE 4 through the power cable, and separately sends an addressing response message specific to each addressing request message through the power cable port.

A path for returning the addressing response message may be implemented in the following two manners:

In the first manner, when forwarding the addressing request message, each RE may add information (for example, information about a receive port and a transmit port) about a forwarding path at each RE to the addressing request message; in this way, the addressing request message may carry information about a forwarding path at each forwarding node. When sending the addressing response message specific to the addressing request message, the RE may add the information about the forwarding path in the addressing request message to the addressing response message, so that the addressing response message is returned to the REC according to a reverse path of the corresponding addressing request message.

In the second manner, for each RE, after receiving the addressing response message at the power cable port or the downlink CPRI port, each RE forwards the addressing response message to the uplink CPRI port.

For example, after receiving the addressing response message of the RE 5 at the power cable port, the RE 4 may encapsulate the addressing response message into a CPRI protocol message, and forward the addressing response message through the uplink CPRI port, and the addressing response message is transparently transmitted by the RE 3, the RE 2, and the RE 1 and arrives at the REC; after receiving the addressing response message of the RE 5 at the power cable port, the RE 3 may encapsulate the addressing response message into a CPRI protocol message, and forward the addressing response message through the uplink CPRI port, and the addressing response message is transparently transmitted by the RE 2 and the RE 1 and arrives at the REC; processing of the RE 1 and the RE 2 on the addressing response message of the RE 5 that is received by the RE 1 and the RE 2 through the power cable port is similar to that of the RE 3 and the RE 4; and the REC may also receive the addressing response message from the RE 5 that is not forwarded by any RE. After receiving the addressing response message forwarded by each RE, the REC determines that a path of the addressing response message does not include a main line, and the REC determines that a main line used for communication with the RE 5 is faulty, and may select, from the path of the addressing response message forwarded by each RE, a standby line used for communication with the RE 5, for example, determine that a path of a response message received the first time from the RE 5 is the standby line; for example, if the addressing response message received the first time is a message on which CPRI protocol encapsulation processing is performed at the RE 4, the REC determines, according to information about the RE 4 encapsulated in the addressing response message received the first time, that a path of the standby line used for communication with the RE 5 is to arrive at the RE 4 through the CPRI line and then is sent by the RE 4 to the RE 5 through the power cable.

For example, after the RE 3 receives the addressing response message of the RE 4 through the power cable port and the downlink CPRI port, the RE 3 separately forwards the addressing response message through the uplink CPRI port, and the addressing response message is transparently transmitted by the RE 2 and the RE 1 and arrives at the REC. The REC determines that the addressing response message of the RE 4 includes a response message that arrives at the REC through the main line, and determines that a main line used for communication with the RE 4 is not faulty, and normally communicates with the RE 4 through the main line. Determining whether a main line of the RE 2, a main line of the RE 3, and a main line of the RE 1 are faulty is similar to determining whether the main line of the RE 4 is faulty, and details are not provided herein again.

Figure 4:
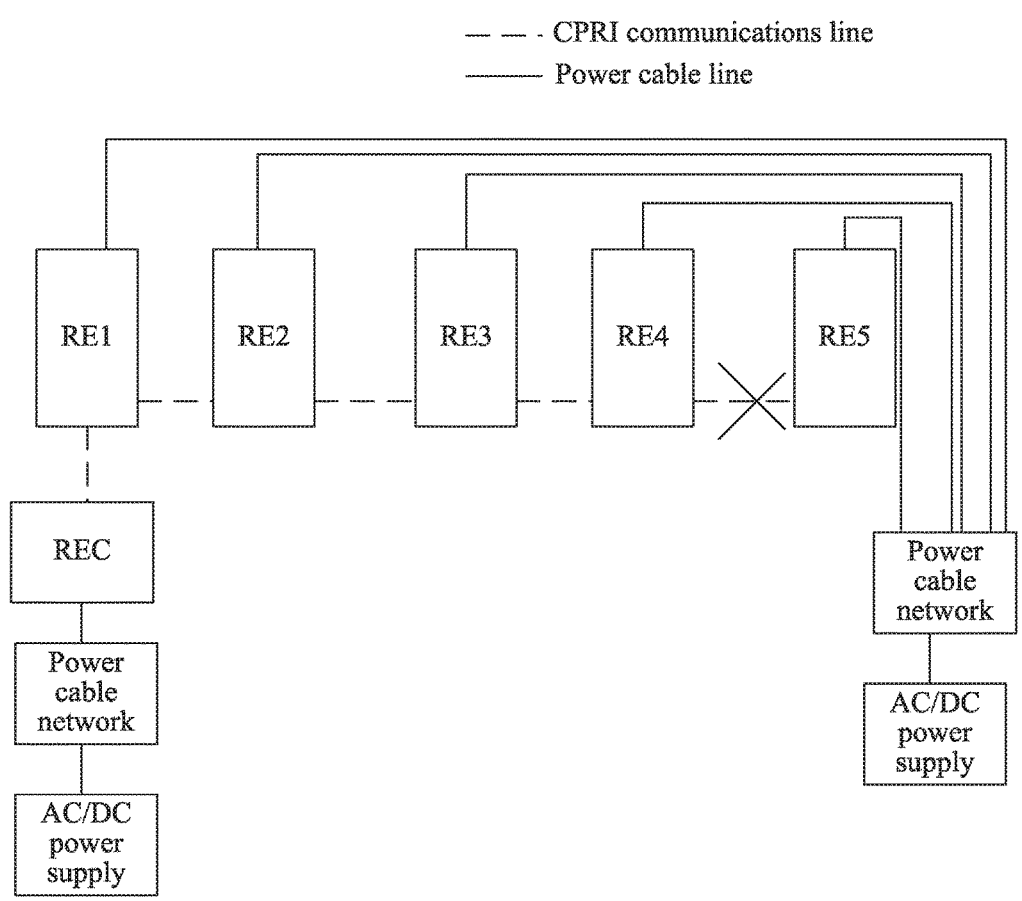
FIG. 4 is a schematic diagram of an application scenario according to another embodiment of the present invention.

In FIG. 4, an RE 1, an RE 2, an RE 3, an RE 4, and an RE 5 belong to a same power cable network, while an REC belongs to another power cable network; and it is assumed that a CPRI communications line from the RE 4 to the RE 5 is faulty, for example, the CPRI communications line from the RE 4 to the RE 5 is faulty due to a hardware fault of the RE 5 or an improper optical port parameter of the RE 5.

The REC sends an addressing request message through a CPRI port or through a power cable port and a CPRI port, where the addressing request message is specific to all the REs. In FIG. 4, because an RE that belongs to the same power cable network as the REC does not exist, the REC may send the addressing request message only through the CPRI port. Optionally, the REC may not determine whether an RE that belongs to the same power cable network as the REC exists, and may directly send the addressing request message according to a CPRI port and a power cable port to which the REC belongs. The addressing request message sent by the REC may arrive at the RE 1 through the CPRI port.

For each RE, processing on the addressing request message may meet the following principles: if the addressing request message is received at an uplink CPRI port, the addressing request message is forwarded to the power cable port and a downlink CPRI port, and an addressing response message is returned to the uplink CPRI port; and if the addressing request message is received at the power cable port, an addressing response message is returned at the power cable port, and the addressing request message is no longer forwarded.

For example, for the RE 1, if the RE 1 receives the addressing request message through the uplink CPRI port, the RE 1 may return an addressing response message to the REC through the uplink CPRI port, and forward the addressing request message through the downlink CPRI port and the power cable port.

For example, for the RE 2, if the RE 2 receives, through the uplink CPRI port, the addressing request message forwarded by the RE 1, the RE 2 may return an addressing response message to the REC through the uplink CPRI port, and forward the addressing request message through the downlink CPRI port and the power cable port; and if the RE 2 receives the addressing request message through the power cable port, the RE 2 may return the addressing response message to the REC through the power cable port, and perform no forwarding.

For example, for the RE 3, if the RE 3 receives, through the uplink CPRI port, the addressing request message forwarded by the RE 2, the RE 3 may return an addressing response message through the uplink CPRI port, and forward the addressing request message through the downlink CPRI port and the power cable port; and if the RE 3 receives the addressing request message through the power cable port, the RE 3 may return the addressing response message to the REC through the power cable port, and perform no forwarding.

For example, for the RE 4, if the RE 4 receives, through the uplink CPRI port, the addressing request message forwarded by the RE 3, the RE 4 may return an addressing response message to the REC through the uplink CPRI port, and forward the addressing request message through the downlink CPRI port and the power cable port; and if the RE 4 receives the addressing request message through the power cable port, the RE 4 may return the addressing response message to the REC through the power cable port, and perform no forwarding.

For example, for the RE 5, the RE 5 receives, through the power cable port, the addressing request message that is forwarded by the RE 1, the RE 2, the RE 3, and the RE 4 through the power cable, and separately sends, through the power cable port, an addressing response message specific to the addressing request message forwarded by each RE; and because the CPRI line between the RE 4 and the RE 5 is faulty, the RE 5 cannot receive the addressing request message that is forwarded by the RE 4 through the downlink CPRI port.

A returning path of the addressing response message may be implemented in the following two manners:

In the first manner, when forwarding the addressing request message, each RE may add information (for example, information about a receive port and a transmit port) about a forwarding path at each RE to the addressing request message; in this way, the addressing request message may carry information about a forwarding path at each forwarding node. When sending the addressing response message specific to the addressing request message, the RE may add the information about the forwarding path in the addressing request message to the addressing response message, so that the addressing response message is returned to the REC according to a reverse path of the corresponding addressing request message.

In the second manner, for each RE, after receiving the addressing response message at the power cable port or the downlink CPRI port, each RE forwards the addressing response message to the uplink CPRI port.

For example, after receiving the addressing response message of the RE 5 at the power cable port, the RE 4 may encapsulate the addressing request message into a CPRI protocol message, and forward the addressing response message through the uplink CPRI port, and the addressing response message is transparently transmitted by the RE 3, the RE 2, and the RE 1 and arrives at the REC; after receiving the addressing response message of the RE 5 at the power cable port, the RE 3 may encapsulate the addressing request message into a CPRI protocol message, and forward the addressing response message through the uplink CPRI port; the addressing response message is transparently transmitted by the RE 2 and the RE 1 and arrives at the REC; and processing of the RE 1 and the RE 2 on the addressing response message of the RE 5 that is received by the RE 1 and the RE 2 through the power cable port is similar to that of the RE 3 and the RE 4. After receiving the addressing response message from the RE 5 that is forwarded by each RE, the REC determines that a path of the addressing response message does not include a main line, and the REC determines that a main line used for communication with the RE 5 is faulty, and may select, from the path of the addressing response message forwarded by each RE, a standby line used for communication with the RE 5, for example, determine that a path of a response message received the first time from the RE 5 is the standby line; for example, if the addressing response message received the first time is a message on which CPRI protocol encapsulation processing is performed at the RE 4, the REC determines, according to information about the RE 1 encapsulated in the addressing response message received the first time, that a path of the standby line used for communication with the RE 5 is that a to-be-sent message arrives at the RE 4 through the CPRI line and then is sent by the RE 4 to the RE 5 through the power cable.

For example, after the RE 3 receives the addressing response message of the RE 4 through the power cable port and the downlink CPRI port, the RE 3 separately forwards the addressing response message from the power cable port and the downlink CPRI port through the uplink CPRI port, and the addressing response message is transparently transmitted by the RE 2 and the RE 1 and arrives at the REC; and processing on the addressing response message of the RE 4 that is received by the RE 2 and the RE 1 is similar. The REC determines that the addressing response message of the RE 4 includes a response message that arrives at the REC through the main line, and determines that a main line used for communication with the RE 4 is not faulty, and normally communicates with the RE through the main line. Determining whether a main line of the RE 2, a main line of the RE 3, and a main line of the RE 1 are faulty is similar to determining whether the main line of the RE 4 is faulty, and details are not provided herein again.

Figure 5:
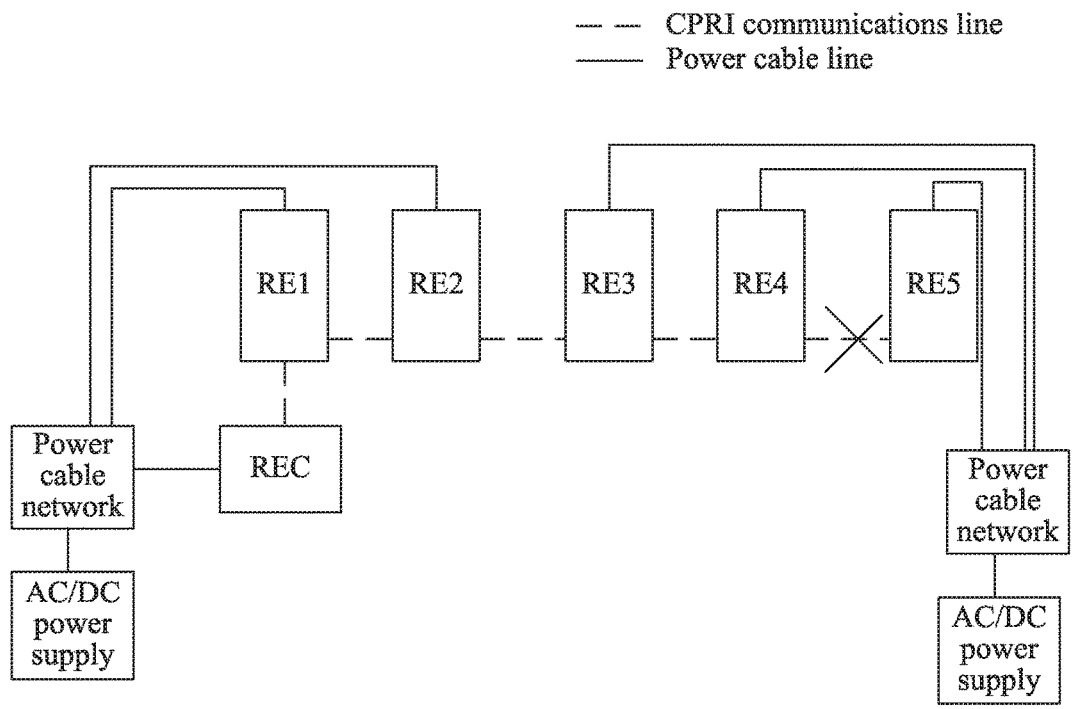
FIG. 5 is a schematic diagram of an application scenario according to another embodiment of the present invention.

In FIG. 5, an REC, an RE 1, and an RE 2 belong to a same power cable network, and an RE 3, an RE 4, and an RE 5 belongs to another power cable network; and it is assumed that a CPRI communications line from the RE 4 to the RE 5 is faulty, for example, the CPRI communications line from the RE 4 to the RE 5 is faulty due to a hardware fault of the RE 5 or an improper optical port parameter of the RE 5.

The REC sends an addressing request message through a power cable port and a CPRI port, where the addressing request message is specific to all the REs. In FIG. 5, because an RE that belongs to the same power cable network as the REC exists in the REC, that is, the RE 1 and the RE 2, the REC may send the addressing request message through the power cable port and the CPRI port. Optionally, the REC may not determine whether an RE that belongs to the same power cable network as the REC exists, and may directly send the addressing request message according to a CPRI port and a power cable port to which the REC belongs. The addressing request message sent by the REC may directly arrive at the RE 1 and the RE 2 through a power cable, and arrive at the RE 1 through a CPRI communications line.

For each RE, processing on the addressing request message may meet the following principles: if the addressing request message is received at an uplink CPRI port, the addressing request message is forwarded to the power cable port and a downlink CPRI port, and an addressing response message is returned to the uplink CPRI port; and if the addressing request message is received at the power cable port, an addressing response message is returned at the power cable port, and the addressing request message is no longer forwarded.

For example, for the RE 1, if the RE 1 receives the addressing request message through the uplink CPRI port, the RE 1 may return an addressing response message to the REC through the uplink CPRI port, and forward the addressing request message through the downlink CPRI port and the power cable port; and if the RE 1 receives the addressing request message through the power cable port, the RE 1 may return the addressing response message to the REC through the power cable port, and perform no forwarding.

For example, for the RE 2, if the RE 2 receives, through the uplink CPRI port, the addressing request message forwarded by the RE 1, the RE 2 may return an addressing response message to the REC through the uplink CPRI port, and forward the addressing request message through the downlink CPRI port and the power cable port; and if the RE 2 receives the addressing request message through the power cable port, the RE 2 may return the addressing response message to the REC through the power cable port, and perform no forwarding.

For example, for the RE 3, if the RE 3 receives, through the uplink CPRI port, the addressing request message forwarded by the RE 2, the RE 3 may return an addressing response message through the uplink CPRI port, and forward the addressing request message through the downlink CPRI port and the power cable port.

For example, for the RE 4, if the RE 4 receives, through the uplink CPRI port, the addressing request message forwarded by the RE 3, the RE 4 may return an addressing response message to the REC through the uplink CPRI port, and forward the addressing request message through the downlink CPRI port and the power cable port; and if the RE 4 receives the addressing request message through the power cable port, the RE 4 may return the addressing response message to the REC through the power cable port, and perform no forwarding.

For example, for the RE 5, the RE 5 receives, through the power cable port, the addressing request message that is forwarded by the RE 3 and the RE 4 through the power cable, and separately sends, through the power cable port, an addressing response message specific to each addressing request message; and because the CPRI line between the RE 4 and the RE 5 is faulty, the RE 5 cannot receive the addressing request message that is forwarded by the RE 4 through the downlink CPRI port.

A path of returning the addressing response message may be implemented in the following two manners:

In the first manner, when forwarding the addressing request message, each RE may add information (for example, information about a receive port and a transmit port) about a forwarding path at each RE to the addressing request message; in this way, the addressing request message may carry information about a forwarding path at each forwarding node. When sending the addressing response message specific to the addressing request message, the RE may add the information about the forwarding path in the addressing request message to the addressing response message, so that the addressing response message is returned to the REC according to a reverse path of the corresponding addressing request message.

In the second manner, for each RE, after receiving the addressing response message at the power cable port or the downlink CPRI port, each RE forwards the addressing response message to the uplink CPRI port.

For example, after receiving the addressing response message of the RE 5 at the power cable port, the RE 4 may encapsulate the addressing request message into a CPRI protocol message, and forward the addressing response message through the uplink CPRI port, and the addressing response message is transparently transmitted by the RE 3, the RE 2, and the RE 1 and arrives at the REC; after receiving the addressing response message of the RE 5 at the power cable port, the RE 3 may encapsulate the addressing response message into a CPRI protocol message, and forward the addressing response message through the uplink CPRI port, and the addressing response message is transparently transmitted by the RE 2 and the RE 1 and arrives at the REC. When receiving multiple addressing response messages, the REC determines that paths of the multiple addressing response messages do not include a main line, and the REC determines that a main line used for communication with the RE 5 is faulty, and may select, from the paths of the multiple addressing response messages, a standby line used for communication with the RE 5, for example, determine that a path of a response message received the first time from the RE 5 is the standby line; for example, if the addressing response message received the first time is a message on which CPRI protocol encapsulation processing is performed at the RE 3, the REC determines, according to information about the RE 3 encapsulated in the addressing response message received the first time, that a path of the standby line used for communication with the RE 5 is that a to-be-sent message is transparently transmitted by the RE 1 and the RE 2 through the CPRI line and arrives at the RE 3 and then is sent by the RE 3 to the RE 5 through the power cable.

For example, after the RE 3 receives the addressing response message of the RE 4 through the power cable port and the downlink CPRI port, the RE 3 separately forwards the addressing response message through the uplink CPRI port, and the addressing response message is transparently transmitted by the RE 2 and the RE 1 and arrives at the REC. The REC determines that the addressing response message of the RE 4 includes a response message that arrives at the REC through the main line, and determines that a main line used for communication with the RE 4 is not faulty, and normally communicates with the RE through the main line. Determining whether a main line of the RE 2, a main line of the RE 3, and a main line of the RE 1 are faulty is similar to determining whether the main line of the RE 4 is faulty, and details are not provided herein again.

Therefore, in this embodiment of the present invention, an REC may send an addressing request message specific to all REs, determine, according to a path of an addressing response message returned by each RE, an RE whose main line is faulty, determine a standby line used for communication with the RE whose main line is faulty, and communicate, by using the standby line, the RE whose main line is faulty; therefore, when the main line is faulty, manual onsite processing is not required, a maintenance cost is reduced, and a service interruption time is reduced, thereby improving user experience.

Embodiment B

In this embodiment, the REC may determine, by using a heartbeat with the RE, whether the main line used by the REC to communicate with the RE is faulty. Specifically, the REC and the RE exchange heartbeat messages with each other through the main line, and if the REC does not receive, for a predetermined number of times, a heartbeat message sent by the RE, the REC determines that the main line used by the REC to communicate with the RE is faulty.

Optionally, after the REC determines that the main line used for communication with the first RE is faulty, the REC sends an addressing request message specific to the first RE through at least one of a power cable port and a CPRI port.

Optionally, the first RE receives the addressing request message through a first port, and sends an addressing response message through the first port, where the first port is an uplink CPRI port or a power cable port; and the REC determines, according to a path of at least one addressing response message sent by the first RE, the standby line used for communication with the first RE.

Optionally, before the first RE receives the addressing request message through the first port, and when an upstream RE of the first RE receives the addressing request message through an uplink CPRI port, the upstream RE of the first RE forwards the addressing request message through the downlink CPRI port and the power cable port.

Optionally, before the upstream RE of the first RE forwards the addressing request message through the downlink CPRI port and the power cable port, the upstream RE of the first RE adds a message of a forwarding path at the upstream RE to the addressing request message; before the first RE sends the addressing response message through the first port, the first RE adds the message of the forwarding path to the addressing response message; and after the upstream RE of the first RE receives the addressing response message, the upstream RE of the first RE forwards the addressing response message according to the message of the forwarding path in the addressing response message, so that the addressing response message is returned to the REC according to a reverse path of the corresponding addressing request message.

Optionally, the upstream RE of the first RE receives the addressing response message through the downlink CPRI port or the power cable port, and forwards the addressing response message through the uplink CPRI port.

Optionally, the upstream RE of the first RE discards the addressing request message when receiving the addressing request message through the power cable port.

Optionally, when the REC and the first RE belong to a same power cable network, the REC sends the addressing request message specific to the first RE through the power cable port or through the CPRI port and the power cable port; or when the REC and the first RE do not belong to a same power cable network, the REC sends the addressing request message specific to the first RE through the CPRI port or through the CPRI port and the power cable port.

For ease of understanding, how to determine the standby line used for communication with the RE whose main line is faulty in Embodiment B is described in detail below with reference to FIG. 3 to FIG. 5.

In FIG. 3, an REC, an RE 1, an RE 2, an RE 3, an RE 4, and an RE 5 belong to a same power cable network; and it is assumed that a CPRI communications line from the RE 4 to the RE 5 is faulty, for example, the CPRI communications line from the RE 4 to the RE 5 is faulty due to a hardware fault of the RE 5 or an improper optical port parameter of the RE 5. After determining that a main line used for communication with the RE 5 is faulty, the REC sends an addressing request message specific to the RE 5 through a power cable port and a CPRI port.

The addressing request message specific to the RE 5 that is sent by the REC may carry identifier information of the RE 5. The identifier information may be address information of the RE 5 in the power cable network, for example, a MAC address or an IP address of the RE 5 in the power cable network.

The addressing request message sent by the REC may directly arrive at the RE 1, RE 2, RE 3, RE 4, and RE 5 through a power cable, and arrive at the RE 1 through a CPRI communications line.

For each non-target RE, processing on the addressing request message may meet the following principles: if the addressing request message is received at an uplink CPRI port, the addressing request message is forwarded to the power cable port and a downlink CPRI port; and if the addressing request message is received at the power cable port, the addressing request message is discarded.

For a target RE, processing on the addressing request message may meet the following principle: if the addressing request message is received at the power cable port, an addressing response message is returned at the power cable port.

For example, for the RE 1, if the RE 1 receives the addressing request message through the uplink CPRI port, the RE 1 may forward the addressing request message through the downlink CPRI port and the power cable port; and if the RE 1 receives the addressing request message through the power cable port, the RE 1 may discard the addressing request message.

For example, for the RE 2, if the RE 2 receives, through the uplink CPRI port, the addressing request message forwarded by the RE 1, the RE 2 may forward the addressing request message through the downlink CPRI port and the power cable port; and if the RE 2 receives the addressing request message through the power cable port, the RE 2 may discard the addressing request message.

For example, for the RE 3, if the RE 3 receives, through the uplink CPRI port, the addressing request message forwarded by the RE 2, the RE 3 may forward the addressing request message through the downlink CPRI port and the power cable port; and if the RE 3 receives the addressing request message through the power cable port, the RE 3 may discard the addressing request message.

For example, for the RE 4, if the RE 4 receives, through the uplink CPRI port, the addressing request message forwarded by the RE 3, the RE 4 may forward the addressing request message through the downlink CPRI port and the power cable port; and if the RE 4 receives the addressing request message through the power cable port, the RE 4 may discard the addressing request message.

For example, for the RE 5, the RE 5 receives, directly from the REC through the power cable port, the addressing request message that is forwarded by the RE 1, the RE 2, the RE 3, and the RE 4 through the power cable, and separately sends, through the power cable port, an addressing response message corresponding to an addressing request message of each path. Because the CPRI line from the RE 4 to the RE 5 is faulty, the addressing request message sent by the RE 4 through the downlink CPRI port cannot arrive at the RE 5.

A returning path of the addressing response message may be implemented in the following two manners:

In the first manner, when forwarding the addressing request message, each RE may add information (for example, information about a receive port and a transmit port) about a forwarding path at each RE to the addressing request message; in this way, the addressing request message may carry information about a forwarding path at each forwarding node. When sending the addressing response message specific to the addressing request message, the target RE may add the information about the forwarding path in the addressing request message to the addressing response message, so that the addressing response message is returned to the REC according to a reverse path of the corresponding addressing request message.

In the second manner, for each RE, after receiving the addressing response message at the power cable port or the downlink CPRI port, each RE forwards the addressing response message to the uplink CPRI port.

For example, after receiving the addressing response message of the RE 5 at the power cable port, the RE 4 may encapsulate the addressing request message into a CPRI protocol message, and forward the addressing response message through the uplink CPRI port, and the addressing response message is transparently transmitted by the RE 3, the RE 2, and the RE 1 and arrives at the REC; after receiving the addressing response message of the RE 5 at the power cable port, the RE 3 may encapsulate the addressing request message into a CPRI protocol message, and forward the addressing response message through the uplink CPRI port, and the addressing response message is transparently transmitted by the RE 2 and the RE 1 and arrives at the REC. Processing on the addressing response message of the RE 5 that is received by the RE 2 and the RE 1 through the power cable is similar to that of the RE 1 and the RE 2. The REC may select, from paths of multiple addressing response messages, a standby line used for communication with the RE 5, for example, determine that a path of a response message received the first time from the RE 5 is the standby line; for example, if the addressing response message received the first time is a message on which CPRI protocol encapsulation processing is performed at the RE 3, and the REC determines, according to information about the RE 3 encapsulated in the addressing response message received the first time, that a path of the standby line used for communication with the RE 5 is that a to-be-sent message is transparently transmitted by the RE 1 and the RE 2 through the CPRI line and arrives at the RE 3 and then is sent by the RE 3 to the RE 5 through the power cable.

In FIG. 4, an RE 1, an RE 2, an RE 3, an RE 4, and an RE 5 belong to a same power cable network, while an REC belongs to another power cable network; and it is assumed that a CPRI communications line from the RE 4 to the RE 5 is faulty, for example, the CPRI communications line from the RE 4 to the RE 5 is faulty due to a hardware fault of the RE 5 or an improper optical port parameter of the RE 5. After determining that a main line used for communication with the RE 5 is faulty, the REC sends an addressing request message specific to the RE 5 through a power cable port and a CPRI port. In FIG. 4, because the REC and the RE 5 do not belong to the same power cable network, the REC may send the addressing request message through the power cable port and the CPRI port or through the CPRI port. Optionally, the REC may not determine whether the REC and the RE 5 belongs to the same power cable network, and may directly send the addressing request message according to a CPRI port and a power cable port to which the REC belongs. The addressing request message sent by the REC may directly arrive at the RE 1 and the RE 2 through a power cable, and arrive at the RE 1 through a CPRI communications line.

For each non-target RE, processing on the addressing request message may meet the following principles: if the addressing request message is received at an uplink CPRI port, the addressing request message is forwarded to the power cable port and a downlink CPRI port; and if the addressing request message is received at the power cable port, the addressing request message is discarded.

For a target RE, processing on the addressing request message may meet the following principle: if the addressing request message is received at the power cable port, an addressing response message is returned at the power cable port.

For example, for the RE 1, if the RE 1 receives the addressing request message through the uplink CPRI port, the RE 1 may forward the addressing request message through the downlink CPRI port and the power cable port; and if the RE 1 receives the addressing request message through the power cable port, the RE 1 may discard the addressing request message.

For example, for the RE 2, if the RE 2 receives, through the uplink CPRI port, the addressing request message forwarded by the RE 1, the RE 2 may forward the addressing request message through the downlink CPRI port and the power cable port; and if the RE 2 receives the addressing request message through the power cable port, the RE 2 may discard the addressing request message.

For example, for the RE 3, if the RE 3 receives, through the uplink CPRI port, the addressing request message forwarded by the RE 2, the RE 3 may forward the addressing request message through the downlink CPRI port and the power cable port; and if the RE 3 receives the addressing request message through the power cable port, the RE 3 may discard the addressing request message.

For example, for the RE 4, if the RE 4 receives, through the uplink CPRI port, the addressing request message forwarded by the RE 3, the RE 4 may forward the addressing request message through the downlink CPRI port and the power cable port; and if the RE 4 receives the addressing request message through the power cable port, the RE 4 may discard the addressing request message.

For example, for the RE 5, the RE 5 receives, through the power cable port, the addressing request message that is forwarded by each RE through the power cable, and separately sends, through the power cable port, an addressing response message corresponding to the addressing request message forwarded by each RE. Because the CPRI line from the RE 4 to the RE 5 is faulty, the RE 5 cannot receive the addressing request message that is forwarded by the RE 4 through the downlink CPRI port.

A returning path of the addressing response message may be implemented in the following two manners:

In the first manner, when forwarding the addressing request message, each RE may add information (for example, information about a receive port and a transmit port) about a forwarding path at each RE to the addressing request message; in this way, the addressing request message may carry information about a forwarding path at each forwarding node. When sending the addressing response message specific to the addressing request message, the target RE may add the information about the forwarding path in the addressing request message to the addressing response message, so that the addressing response message is returned to the REC according to a reverse path of the corresponding addressing request message.

In the second manner, for each RE, after receiving the addressing response message at the power cable port or the downlink CPRI port, each RE forwards the addressing response message to the uplink CPRI port.

For example, after receiving the addressing response message of the RE 5 at the power cable port, the RE 4 may encapsulate the addressing request message into a CPRI protocol message, and forward the addressing response message through the uplink CPRI port, and the addressing response message is transparently transmitted by the RE 3, the RE 2, and the RE 1 and arrives at the REC; after receiving the addressing response message of the RE 5 at the power cable port, the RE 3 may encapsulate the addressing response message into a CPRI protocol message, and forward the addressing response message through the uplink CPRI port, and the addressing response message is transparently transmitted by the RE 2 and the RE 1 and arrives at the REC. Processing on the addressing response message of the RE 5 that is received by the RE 2 and the RE 1 through the power cable is similar to that of the RE 3 and the RE 4. The REC may select, from paths of multiple addressing response messages, a standby line used for communication with the RE 5, for example, determine that a path of a response message received the first time from the RE 5 is the standby line; for example, if the addressing response message received the first time is a message on which CPRI protocol encapsulation processing is performed at the RE 3, and the REC determines, according to information about the RE 3 encapsulated in the addressing response message received the first time, that a path of the standby line used for communication with the RE 5 is that a to-be-sent message is transparently transmitted by the RE 1 and the RE 2 through the CPRI line and arrives at the RE 3 and then is sent by the RE 3 to the RE 5 through the power cable.

In FIG. 5, an REC, an RE 1, and an RE 2 belong to a same power cable network, and an RE 3, an RE 4, and an RE 5 belongs to another power cable network; and it is assumed that a CPRI communications line from the RE 4 to the RE 5 is faulty, for example, the CPRI communications line from the RE 4 to the RE 5 is faulty due to a hardware fault of the RE 5 or an improper optical port parameter of the RE 5. After determining that a main line used for communication with the RE 5 is faulty, the REC sends an addressing request message specific to the RE 5 through a power cable port and a CPRI port. In FIG. 5, because the REC and the RE 5 do not belong to the same power cable network, the REC may send the addressing request message through the power cable port and the CPRI port or through the CPRI port. Optionally, the REC may not determine whether the REC and the RE 5 belongs to the same power cable network, and may directly send the addressing request message according to a CPRI port and a power cable port to which the REC belongs. The addressing request message sent by the REC may directly arrive at the RE 1 and the RE 2 through a power cable, and arrive at the RE 1 through a CPRI communications line.

For each non-target RE, processing on the addressing request message may meet the following principles: if the addressing request message is received at an uplink CPRI port, the addressing request message is forwarded to the power cable port and a downlink CPRI port; and if the addressing request message is received at the power cable port, the addressing request message is discarded; and for a target RE, processing on the addressing request message may meet the following principle: if the addressing request message is received at the power cable port, an addressing response message is returned at the power cable port.

For example, for the RE 1, if the RE 1 receives the addressing request message through the uplink CPRI port, the RE 1 may forward the addressing request message through the downlink CPRI port and the power cable port; and if the RE 1 receives the addressing request message through the power cable port, the RE 1 may discard the addressing request message.

For example, for the RE 2, if the RE 2 receives, through the uplink CPRI port, the addressing request message forwarded by the RE 1, the RE 2 may forward the addressing request message through the downlink CPRI port and the power cable port; and if the RE 2 receives the addressing request message through the power cable port, the RE 2 may discard the addressing request message.

For example, for the RE 3, if the RE 3 receives, through the uplink CPRI port, the addressing request message forwarded by the RE 2, the RE 3 may forward the addressing request message through the downlink CPRI port and the power cable port.

For example, for the RE 4, if the RE 4 receives, through the uplink CPRI port, the addressing request message forwarded by the RE 3, the RE 4 may forward the addressing request message through the downlink CPRI port and the power cable port; and if the RE 4 receives the addressing request message through the power cable port, the RE 4 may discard the addressing request message.

For example, for the RE 5, the RE 5 receives, through the power cable port, the addressing request message that is forwarded by the RE 3 and the RE 4 through the power cable, and separately sends, through the power cable port, an addressing response message specific to the addressing request message forwarded by the RE 3 and the RE 4. Because the CPRI line from the RE 4 to the RE 5 is faulty, the RE 5 cannot receive the addressing request message that is forwarded by the RE 4 through the downlink CPRI port.

A returning path of the addressing response message may be implemented in the following two manners:

In the first manner, when forwarding the addressing request message, each RE may add information (for example, information about a receive port and a transmit port) about a forwarding path at each RE to the addressing request message; in this way, the addressing request message may carry information about a forwarding path at each forwarding node. When sending the addressing response message specific to the addressing request message, the target RE may add the information about the forwarding path in the addressing request message to the addressing response message, so that the addressing response message is returned to the REC according to a reverse path of the corresponding addressing request message.

In the second manner, for each RE, after receiving the addressing response message at the power cable port or the downlink CPRI port, each RE forwards the addressing response message to the uplink CPRI port.

For example, after receiving the addressing response message of the RE 5 at the power cable port, the RE 4 may encapsulate the addressing request message into a CPRI protocol message, and forward the addressing response message through the uplink CPRI port, and the addressing response message is transparently transmitted by the RE 3, the RE 2, and the RE 1 and arrives at the REC; after receiving the addressing response message of the RE 5 at the power cable port, the RE 3 may encapsulate the addressing response message into a CPRI protocol message, and forward the addressing response message through the uplink CPRI port, and the addressing response message is transparently transmitted by the RE 2 and the RE 1 and arrives at the REC. The REC may select, from paths of multiple addressing response messages, a standby line used for communication with the RE 5, for example, determine that a path of a response message received the first time from the RE 5 is the standby line; for example, if the addressing response message received the first time is a message on which CPRI protocol encapsulation processing is performed at the RE 3, the REC determines, according to information about the RE 3 encapsulated in the addressing response message received the first time, that a path of the standby line used for communication with the RE 5 is that a to-be-sent message is transparently transmitted by the RE 1 and the RE 2 through the CPRI line and arrives at the RE 3 and then is sent by the RE 3 to the RE 5 through the power cable.

Therefore, in this embodiment of the present invention, after an REC determines a main line used for communication with an RE is faulty, the REC may send an addressing request message specific to the RE, and determine, according to a path of an addressing response message returned by the RE, a standby line used for communication with the RE whose main line is faulty; therefore, when the main line is faulty, manual onsite processing is not required, a maintenance cost is reduced, and a service interruption time is reduced, thereby improving user experience.

It should be understood that, in this embodiment of the present invention, that an REC and an RE belong to a same power cable network means that the REC and the RE can communicate only through a power cable. That the REC and the RE do not belong to a same power cable network means that the REC and the RE cannot communicate only through a power cable.

Therefore, in this embodiment of the present invention, when an REC determines that a main line used for communication with any RE is faulty, the REC may determine a standby line used for communication with the RE whose main line is faulty, and communicate, by using the standby line, with the RE whose main line is faulty; therefore, when the main line is faulty, manual onsite processing is not required, a maintenance cost is reduced, and a service interruption time is reduced, thereby improving user experience.

Figure 6:
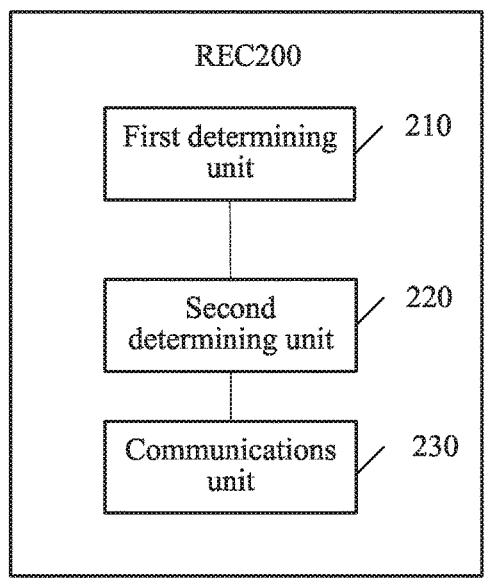
FIG. 6 is a schematic block diagram of an REC according to another embodiment of the present invention.

FIG. 6 is a schematic block diagram of an REC 200 according to an embodiment of the present invention. As shown in FIG. 6, the REC 200 includes: a first determining unit 210, configured to determine that a main line used by the REC 200 to communicate with a first RE is faulty; a second determining unit 220, configured to determine a standby line used by the REC 200 to communicate with the first RE; and a communications unit 230, configured to communicate with the first RE by using the standby line.

Therefore, in this embodiment of the present invention, when a first determining unit determines that a main line used by an REC 200 to communicate with any RE is faulty, a second determining unit 220 may determine a standby line used by the REC 200 to communicate with the RE whose main line is faulty; and a communications unit 230 communicates, by using the standby line, with the RE whose main line is faulty; therefore, when the main line is faulty, manual onsite processing is not required, a maintenance cost is reduced, and a service interruption time is reduced, thereby improving user experience.

In this embodiment of the present invention, the REC 200 may be also referred to as a BBU, and the RE may be also referred to as an RRU.

In this embodiment of the present invention, the main line may be a CPRI communications line; and the standby line may be a power cable line, or be a power cable plus CPRI communications line. Certainly, the main line may be a power cable line, or be a power cable plus CPRI communications line; and the standby line is a CPRI communications line, or is in another manner, which may be specifically determined according to an application scenario, and are not limited by this embodiment of the present invention. However, in this embodiment of the present invention, that the main line is a CPRI communications line, and the standby line is a power cable line, or is a power cable plus CPRI communications line is mainly used for description.

Because the REC and the RE are inherently powered by a power cable network, in this embodiment of the present invention, when a fault occurs in the CPRI communications line between the REC and the RE, communication between the REC and the RE is implemented by using the power cable network of the REC and the RE.

In this embodiment of the present invention, the CPRI communications line refers to a line supporting the CPRI protocol; and the CPRI communications line may include at least one of an optical fiber, a coaxial cable, and an Ethernet cable.

In this embodiment of the present invention, the communications unit 230 is specifically configured to: reset or upgrade the first RE through the standby line, to recover the main line used by the REC to communicate with the first RE.

For example, a cause of the fault of the main line of the first RE is that an optical port parameter of the RE is improper; therefore, the optical port parameter of the RE may be modified through the standby line, so as to recover the main line.

For another example, a problem occurs in hardware of the RE; as a result, the RE cannot be normally started, and can only be recovered by performing power-on and power-off. Because, in this case, a problem already occurs in the RE, communication with the RE cannot be successfully performed by using the CPRI communications line. Therefore, the second determining unit 220 may determine the standby line, where the standby line may include a power cable; and the communications unit 230 may send indication information to the RE through the standby line, to instruct the RE to perform power-on and power-off.

In this embodiment of the present invention, the REC 200 may scan all controlled REs in real time (for example, periodically or at an initialization phase), determine an RE whose main line is faulty, and determine a standby line of the RE whose main line is faulty; and the REC 200 may also determine, by exchanging a heartbeat message with an RE, that a main line used for communication with the RE is faulty, and determine a standby line used for communication with the RE. For ease of understanding, the two cases are described in detail below with reference to Embodiment C and Embodiment D.

Embodiment C

In this embodiment, the REC 200 may scan the RE (the first RE) whose main line is faulty in all the controlled REs in real time (for example, periodically or at the initialization phase), and determine the standby line of the RE whose main line is faulty.

Figure 7:
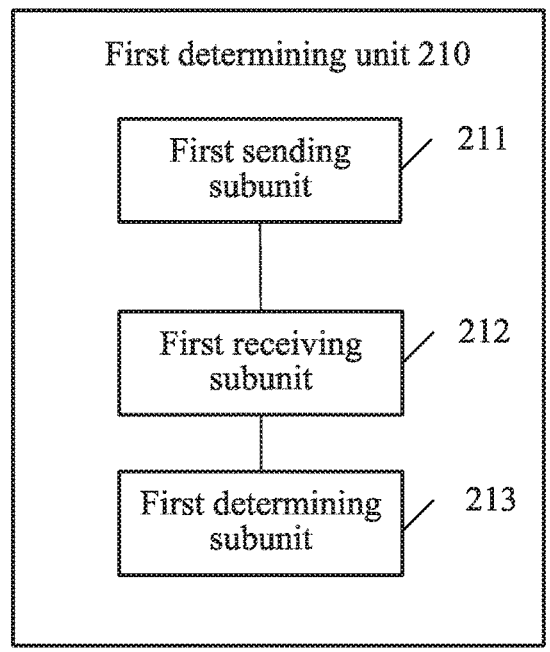
FIG. 7 is a schematic block diagram of an REC according to another embodiment of the present invention.

Optionally, as shown in FIG. 7, the first determining unit 210 includes a first sending subunit 211, a first receiving subunit 212, and a first determining subunit 213, where the first sending subunit 211 is configured to send an addressing request message specific to all controlled REs through a CPRI port or through a power cable port and a CPRI port; the first receiving subunit 212 is configured to receive an addressing response message from at least one RE, where the at least one RE includes the first RE; and the first determining subunit 213 is configured to: when it is determined that a path of at least one addressing response message received by the first receiving subunit 212 from the first RE does not include the main line, determine that the main line used for communication with the first RE is faulty; and the second determining unit 220 is specifically configured to: when the path of the at least one addressing response message received by the first receiving subunit 212 from the first RE does not include the main line, determine, according to the path of the at least one addressing response message, the standby line used for communication with the first RE.

Optionally, the first sending subunit 211 is specifically configured to: when an RE that belongs to a same power cable network as the REC 200 exists in all the REs, send the addressing request message specific to all the REs through the CPRI port and the power cable port; or when an RE that belongs to a same power cable network as the REC 200 does not exist in all the REs, send the addressing request message specific to all the REs through the CPRI port or through the CPRI port and the power cable port.

Optionally, the second determining unit 220 is specifically configured to: determine that a path of an addressing response message received by the receiving subunit 212 the first time from the first RE is the standby line used for communication with the first RE.

It should be understood that, the REC 200 in Embodiment C may correspond to the REC in Embodiment A, the REC 200 may have corresponding functions of the REC in Embodiment A, and for brevity, details are not provided herein again.

Therefore, in this embodiment of the present invention, an REC may send an addressing request message specific to all REs, determine, according to a path of an addressing response message returned by each RE, an RE whose main line is faulty, and determine a standby line used for communication with the RE whose main line is faulty; therefore, when the main line is faulty, manual onsite processing is not required, a maintenance cost is reduced, and a service interruption time is reduced, thereby improving user experience.

Embodiment D

In this embodiment, the REC 200 may determine, by using a heartbeat between the REC 200 and the RE, whether the main line used by the REC 200 to communicate with the RE is faulty. Specifically, the REC 200 and the RE exchange heartbeat messages with each other through the main line, and if the REC 200 does not receive, for a predetermined number of times, heartbeat information sent by the RE, the REC determines that the main line used by the REC to communicate with the RE is faulty.

Figure 8:
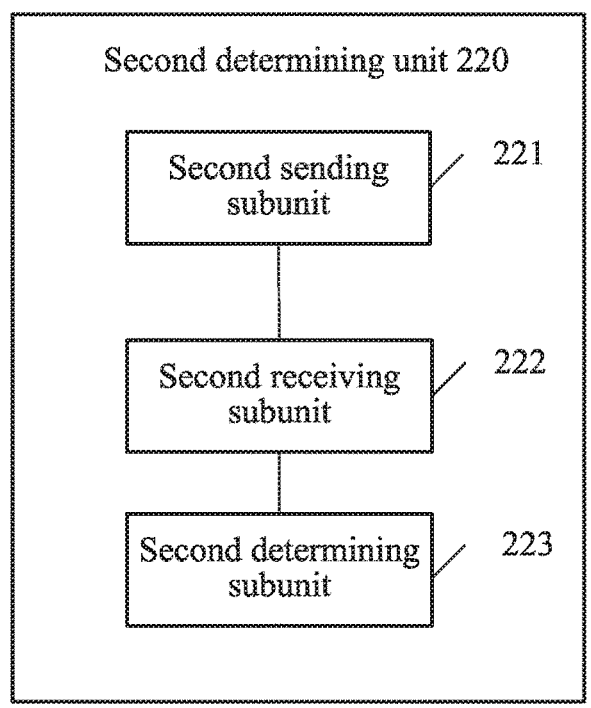
FIG. 8 is a schematic block diagram of an REC according to another embodiment of the present invention.

Optionally, as shown in FIG. 8, the second determining unit 220 includes: a second sending subunit 221, configured to: after the first determining unit 210 determines that the main line used by the REC 200 to communicate with the first RE is faulty, send an addressing request message specific to the first RE through at least one of a power cable port and a CPRI port; a second receiving subunit 222, configured to receive at least one addressing response message from the first RE; and a second determining subunit 223, configured to determine, according to a path of the at least one addressing response message received by the second receiving subunit 222, the standby line used for communication with the first RE.

Optionally, the second sending subunit 221 is specifically configured to: when the REC 200 and the first RE belong to a same power cable network, send the addressing request message specific to the first RE through the power cable port or through the CPRI port and the power cable port; or when the REC 200 and the first RE do not belong to a same power cable network, send the addressing request message specific to the first RE through the CPRI port or through the CPRI port and the power cable port.

Optionally, the second determining subunit 223 is specifically configured to: determine that a path of an addressing response message received by the second receiving subunit 222 the first time from the first RE is the standby line used for communication with the first RE.

Optionally, the communications unit 230 is specifically configured to: reset or upgrade the first RE through the standby line, to recover the main line used by the REC to communicate with the first RE.

It should be understood that, the REC 200 in Embodiment D may correspond to the REC in Embodiment B, the REC 200 may have corresponding functions of the REC in Embodiment B, and for brevity, details are not provided herein again.

Therefore, in this embodiment of the present invention, after an REC determines a main line used for communication with an RE is faulty, the REC may send an addressing request message specific to the RE, and determine, according to a path of an addressing response message returned by the RE, a standby line used for communication with the RE whose main line is faulty; therefore, when the main line is faulty, manual onsite processing is not required, a maintenance cost is reduced, and a service interruption time is reduced, thereby improving user experience.

It should be understood that, in this embodiment of the present invention, that an REC and an RE belong to a same power cable network means that the REC and the RE can communicate only through a power cable. That the REC and the RE do not belong to a same power cable network means that the REC and the RE cannot communicate only through a power cable.

Therefore, in this embodiment of the present invention, when an REC determines that a main line used for communication with any RE is faulty, the REC may determine a standby line used for communication with the RE whose main line is faulty, and communicate, by using the standby line, with the RE whose main line is faulty; therefore, when the main line is faulty, manual onsite processing is not required, a maintenance cost is reduced, and a service interruption time is reduced, thereby improving user experience.

Figure 9:
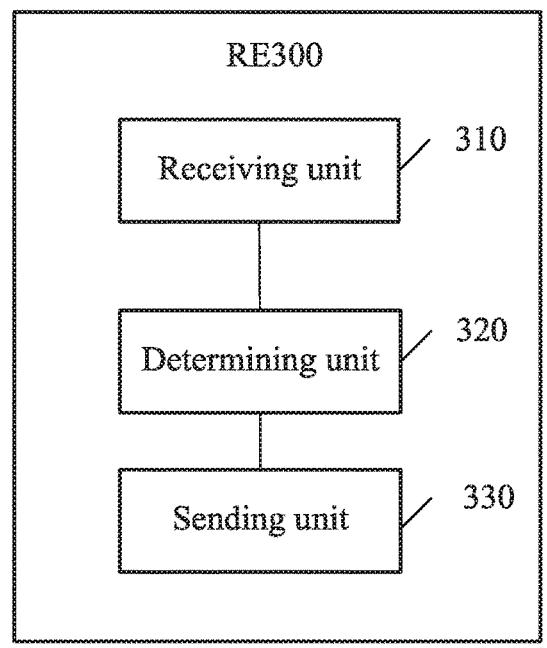
FIG. 9 is a schematic block diagram of an RE according to another embodiment of the present invention.

FIG. 9 is a schematic block diagram of an RE 300 according to an embodiment of the present invention. As shown in FIG. 9, the RE 300 includes: a receiving unit 310, configured to receive, through a first port, an addressing request message sent by an REC, where the first port is an uplink CPRI port or a power cable port; a determining unit 320, configured to determine, according to the addressing request message received by the receiving unit 310, that an object that the addressing request message is specific to includes the RE 300; and a sending unit 330, configured to send a first addressing response message to the REC through the first port.

Optionally, the addressing request message carries information about a forwarding path from the REC to the RE 300; and before the sending unit 330 sends the first addressing response message to the REC through the first port, the sending unit 330 is further configured to add, to the first addressing response message, the information about the forwarding path from the REC to the RE 300, so that the first addressing response message is returned to the REC according to a reverse path of the addressing request message.

It should be understood that, in this embodiment of the present invention, the RE 300 may be an object that the addressing request message is uniquely specific to; in this case, the RE 300 may correspond to the RE 5 in Embodiment B, and can implement corresponding functions of the RE 5.

Therefore, in this embodiment of the present invention, after an REC determines a main line used for communication with an RE is faulty, the REC may send an addressing request message specific to the RE, and the RE returns an addressing response message according to the addressing request message sent by the REC, so that the REC may determine, according to a path of an addressing response message returned by the RE, a standby line used for communication with the RE whose main line is faulty; therefore, when the main line is faulty, manual onsite processing is not required, a maintenance cost is reduced, and a service interruption time is reduced, thereby improving user experience.

It should be further understood that, in this embodiment of the present invention, the object that the addressing request message is specific to may further include another RE except the RE 300. For ease of understanding, this case is described in detail below with reference to Embodiment E.

Embodiment E

In this embodiment, the determining unit 320 is further configured to: determine, according to the addressing request message, that the object that the addressing request message is specific to further includes another RE; and the sending unit 330 is further configured to forward the addressing request message through a downlink CPRI port and a power cable port when the first port is an uplink CPRI port.

Optionally, before the sending unit 330 forwards the addressing request message through the downlink CPRI port and the power cable port, the sending unit 330 is further configured to add information about a forwarding path at the RE 300 to the addressing request message; and after the sending unit 330 forwards the addressing request message through the downlink CPRI port and the power cable port, the receiving unit 310 is further configured to receive a second addressing response message through the downlink CPRI port or through the power cable port, where the second addressing response message carries a message of the forwarding path at the RE 300; and the sending unit is further configured to forward the second addressing response message according to the information about the forwarding path at the RE 300.

Optionally, the receiving unit 310 is further configured to receive a second addressing response message through the downlink CPRI port or the power cable port; and the sending unit 330 is further configured to forward the second addressing response message through an uplink CPRI port.

Optionally, the receiving unit 310 is further configured to receive a second addressing response message through the downlink CPRI port or the power cable port; and the sending unit 330 is further configured to forward the second addressing response message through an uplink CPRI port.

Optionally, the addressing request message carries information about a forwarding path from the REC to the RE 300; and before the sending unit 330 sends the first addressing response message to the REC through the first port, the sending unit 330 is further configured to add, to the first addressing response message, the information about the forwarding path from the REC to the RE 300, so that the first addressing response message is returned to the REC according to a reverse path of the addressing request message.

In Embodiment E, the RE 300 may correspond to any RE in the RE 1, the RE 2, the RE 3, the RE 4, and the RE 5 in Embodiment A, and can implement corresponding functions of the any RE, and for brevity, details are not provided herein again.

Therefore, in this embodiment of the present invention, an REC may send an addressing request message specific to all REs, determine, according to a path of an addressing response message returned by each RE, an RE whose main line is faulty, and determine a standby line used for communication with the RE whose main line is faulty; therefore, when the main line is faulty, manual onsite processing is not required, a maintenance cost is reduced, and a service interruption time is reduced, thereby improving user experience.

Figure 10:
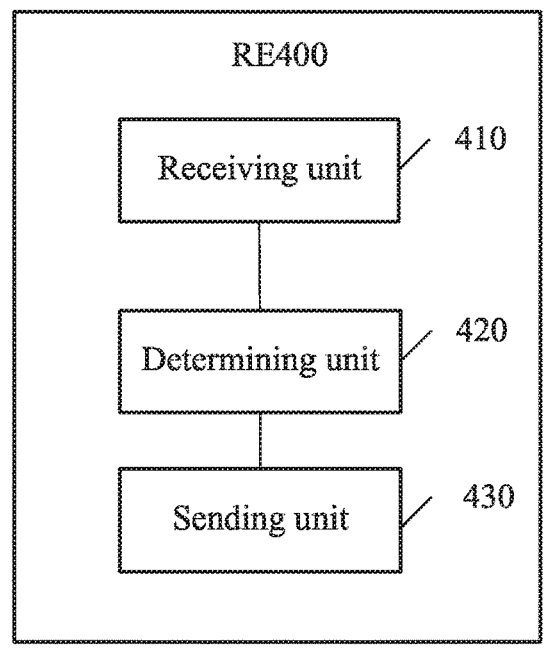
FIG. 10 is a schematic block diagram of an RE according to another embodiment of the present invention.

FIG. 10 is a schematic block diagram of an RE 400 according to an embodiment of the present invention. As shown in FIG. 10, the RE 400 includes: a receiving unit 410, configured to receive, through a first port, an addressing request message sent by the REC; a determining unit 420, configured to determine, according to the addressing request message, that an object that the addressing request message is specific to does not include the RE 400; and a sending unit 430, configured to forward the addressing request message through a power cable port and a downlink CPRI port when the first port is an uplink common public radio interface (CPRI) port.

Optionally, the sending unit 430 is further configured to discard the addressing request message when the first port is a power cable port.

Optionally, before the sending unit 430 forwards the addressing request message through the downlink CPRI port and the power cable port, the sending unit 430 is further configured to add information about a forwarding path at the RE 400 to the addressing request message; and after the sending unit 430 forwards the addressing request message through the downlink CPRI port and the power cable port, the receiving unit is further configured to receive an addressing response message through the downlink CPRI port or the power cable port, where the addressing response message carries the information about the forwarding path at the RE 400; and the sending unit 430 is further configured to forward the addressing response message according to the information about the forwarding path at the RE 400.

Optionally, after the sending unit 430 forwards the addressing request message through the power cable port and the downlink CPRI port, the receiving unit 410 is further configured to receive an addressing response message through the downlink CPRI port or the power cable port; and the sending unit 430 is further configured to forward the addressing response message through an uplink CPRI port.

Optionally, the RE 400 may correspond to any RE in the RE 1, the RE 2, the RE 3, and the RE 4 in Embodiment B, and can implement functions of the any RE, and for brevity, details are not provided herein again.

Therefore, in this embodiment of the present invention, after an REC determines a main line used for communication with an RE is faulty, the REC may send an addressing request message specific to the RE; when receiving the addressing request message, a non-target RE forwards the addressing request message; and when receiving the addressing request message, a target RE returns an addressing response message according to the addressing request message sent by the REC, so that the REC may determine according to a path of the addressing response message returned by the target RE, a standby line used for communication with the target RE whose main line is faulty;

therefore, when the main line is faulty, manual onsite processing is not required, a maintenance cost is reduced, and a service interruption time is reduced, thereby improving user experience.

Figure 11:
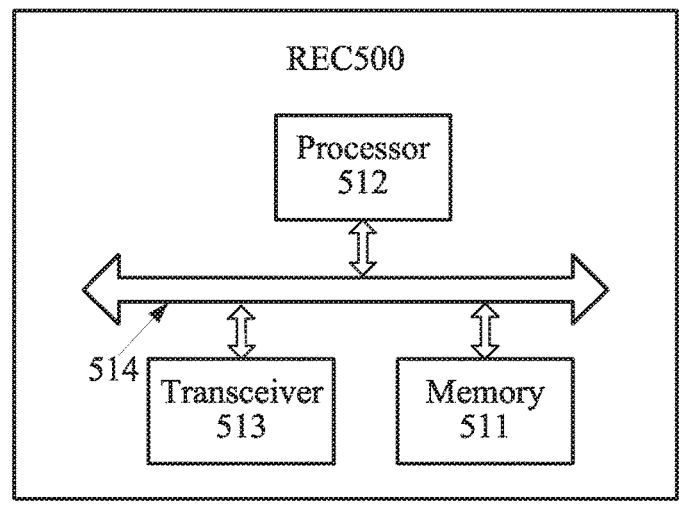
FIG. 11 is a schematic block diagram of an REC according to another embodiment of the present invention.

FIG. 11 is a schematic block diagram of an REC 500 according to an embodiment of the present invention. As shown in FIG. 11, the REC 500 includes: a memory 511, a processor 512, and a transceiver 513. The processor 512, the transceiver 513, and the memory 511 are connected by using a bus 514, the memory 511 stores program code, and the processor 512 invokes the program code in the memory 511 to perform the following processing: determining that a main line used by the REC 500 to communicate with a first radio equipment RE is faulty; determining a standby line used by the REC 500 to communicate with the first RE; and communicating, by controlling the transceiver 513, with the first RE by using the standby line.

Therefore, in this embodiment of the present invention, when an REC 500 determines that a main line used for communication with any RE is faulty, the REC 500 may determine a standby line used for communication with the RE whose main line is faulty, and communicate, by using the standby line, with the RE whose main line is faulty; therefore, when the main line is faulty, manual onsite processing is not required, a maintenance cost is reduced, and a service interruption time is reduced, thereby improving user experience.

It should be understood that, in this embodiment of the present invention, the processor 512 may be a central processing unit (CPU for short), and the processor 512 may also be another general processor, a digital signal processor (DSP), an application specific integrated circuit (ASIC), a field programmable gate array (FPGA), another programmable logic device, a discrete gate, a transistor logic device, or a discrete hardware component. The general processor may be a microprocessor, or the processor may be any conventional processor.

The memory 511 may include a read-only memory and a random access memory, and provide an instruction and data for the processor 512. A part of the memory 511 may further include a non-volatile random access memory. For example, the memory 511 may further store information about a device type.

The bus system 514 includes not only a data bus, but also a power bus, a control bus, a state signal bus, and the like. However, for clear description, various buses are marked as the bus system 514 in the figure.

In an implementation process, the steps of the foregoing method can be completed by using an integrated logical circuit of hardware or an instruction in a software form in the processor 512. With reference to the embodiments of the present invention, the steps in the disclosed method may be directly completed by a hardware processor or completed by a combination of hardware and software modules in the processor. The software module may be located in a storage medium mature in the art, such as a random access memory, a flash memory, a read-only memory, a programmable read-only memory, an electrically erasable programmable memory, or a register. The storage medium is located in the memory 511, and the processor 512 reads information in the memory 511 and completes the steps of the foregoing method in combination with hardware thereof. To avoid repetition, details are not provided herein again.

In this embodiment of the present invention, the REC 500 may be also referred to as a BBU, and the RE may be also referred to as an RRU.

In this embodiment of the present invention, the main line may be a CPRI communications line; and the standby line may be a power cable line, or be a power cable plus CPRI communications line. Certainly, the main line may be a power cable line, or be a power cable plus CPRI communications line; and the standby line is a CPRI communications line, or is in another manner, which may be specifically determined according to an application scenario, and are not limited by this embodiment of the present invention. However, in this embodiment of the present invention, that the main line is a CPRI communications line; and the standby line is a power cable line, or is a power cable plus CPRI communications line is mainly used for description.

Because the REC and the RE are inherently powered by a power cable network, in this embodiment of the present invention, when a fault occurs in the CPRI communications line between the REC and the RE, communication between the REC and the RE is implemented by using the power cable network of the REC and the RE.

In this embodiment of the present invention, the CPRI communications line refers to a line supporting the CPRI protocol; and the CPRI communications line may include at least one of an optical fiber, a coaxial cable, and an Ethernet cable.

In this embodiment of the present invention, the processor 512 invokes the program code in the memory 511 to specifically perform the following processing: resetting or upgrading the first RE through the standby line, to recover the main line used by the REC to communicate with the first RE.

For example, a cause of the fault of the main line of the first RE is that an optical port parameter of the RE is improper; therefore, the optical port parameter of the RE may be modified through the standby line, so as to recover the main line.

For another example, a problem occurs in hardware of the RE; as a result, the RE cannot be normally started, and can only be recovered by performing power-on and power-off. Because, in this case, a problem already occurs in the RE, communication with the RE cannot be successfully performed by using the CPRI communications line. Therefore, the standby line may be determined, where the standby line may include a power cable; and indication information may be sent to the RE through the standby line, to instruct the RE to perform power-on and power-off.

In this embodiment of the present invention, the REC scans all controlled REs, determine, in all the REs, an RE whose main line is faulty, and determine a standby line of the RE whose main line is faulty; and the REC may also determine, after establishing a communication connection to an RE through a main line, that the main line used for communication with the RE is faulty, and determine a standby line used for communication with the RE. For ease of understanding, the two cases are described in detail below with reference to Embodiment F and Embodiment G.

Embodiment F

All the controlled REs are scanned, and the RE (the first RE) whose main line is faulty in all the REs is determined, and the standby line of the RE whose main line is faulty is determined.

Optionally, the processor 512 invokes the program code in the memory 511 to specifically perform the following processing: controlling the transceiver 513 to send, through a CPRI port or through a power cable port and a CPRI port, an addressing request message specific to all controlled REs;

controlling the transceiver 513 to receive an addressing response message from at least one RE, where the at least one RE includes the first RE; when a path of at least one addressing response message from the first RE does not include the main line, the main line used for communication with the first RE being faulty; and when the path of the at least one addressing response message from the first RE does not include the main line, determining, according to the path of the at least one addressing response message, the standby line used for communication with the first RE.

Optionally, the processor 512 invokes the program code in the memory 511 to specifically perform the following processing: when an RE that belongs to a same power cable network as the REC 500 exists in all the REs, controlling the transceiver 513 to send, through the CPRI port and the power cable port, the addressing request message specific to all the REs; or when an RE that belongs to a same power cable network as the REC 500 does not exist in all the REs, controlling the transceiver 513 to send, through the CPRI port or through the CPRI port and the power cable port, the addressing request message specific to all the REs.

Optionally, the processor 512 invokes the program code in the memory 511 to specifically perform the following processing: determining that a path of an addressing response message received the first time from the first RE is the standby line used for communication with the first RE.

It should be understood that, the REC 200 in Embodiment F may correspond to the REC in Embodiment A, the REC 500 may have corresponding functions of the REC in Embodiment A, and for brevity, details are not provided herein again.

Therefore, in this embodiment of the present invention, an REC may send an addressing request message specific to all REs, determine, according to a path of an addressing response message returned by each RE, an RE whose main line is faulty, and determine a standby line used for communication with the RE whose main line is faulty; therefore, when the main line is faulty, manual onsite processing is not required, a maintenance cost is reduced, and a service interruption time is reduced, thereby improving user experience.

Embodiment G

In this embodiment, after the REC 500 determines, by exchanging a heartbeat message with the first RE, that the main line used for communication with the RE is faulty, the REC 500 determines the standby line used for communication with the RE, and communicates with the first RE by using the standby line.

Optionally, the processor 512 invokes the program code in the memory 511 to specifically perform the following processing: after it is determined that the main line used for communication with the first RE is faulty, controlling the transceiver 513 to send, through at least one of a power cable port and a CPRI port, an addressing request message specific to the first RE; controlling the transceiver 513 to receive at least one addressing response message from the first RE; and determining, according to a path of the at least one addressing response message, the standby line used for communication with the first RE.

Optionally, the processor 512 invokes the program code in the memory 511 to specifically perform the following processing: when the REC and the first RE belong to a same power cable network, controlling the transceiver 513 to send, through the power cable port or through the CPRI port and the power cable port, the addressing request message specific to the first RE; or when the REC 500 and the first RE do not belong to a same power cable network, controlling the transceiver 513 to send, through the CPRI port or through the CPRI port and the power cable port, the addressing request message specific to the first RE.

Optionally, the processor 512 invokes the program code in the memory 511 to specifically perform the following processing: determining that a path of an addressing response message received the first time from the first RE is the standby line used for communication with the first RE.

It should be understood that, the REC 500 in Embodiment G may correspond to the REC in Embodiment B, the REC 500 may have corresponding functions of the REC in Embodiment B, and for brevity, details are not provided herein again.

Therefore, in this embodiment of the present invention, after an REC determines a main line used for communication with an RE is faulty, the REC may send an addressing request message specific to the RE, and determine, according to a path of an addressing response message returned by the RE, a standby line used for communication with the RE whose main line is faulty; therefore, when the main line is faulty, manual onsite processing is not required, a maintenance cost is reduced, and a service interruption time is reduced, thereby improving user experience.

It should be understood that, in this embodiment of the present invention, that an REC and an RE belong to a same power cable network means that the REC and the RE can communicate only through a power cable. That the REC and the RE do not belong to a same power cable network means that the REC and the RE cannot communicate only through a power cable.

Therefore, in this embodiment of the present invention, when an REC determines that a main line used for communication with any RE is faulty, the REC may determine a standby line used for communication with the RE whose main line is faulty, and communicate, by using the standby line, with the RE whose main line is faulty; therefore, when the main line is faulty, manual onsite processing is not required, a maintenance cost is reduced, and a service interruption time is reduced, thereby improving user experience.

Figure 12:
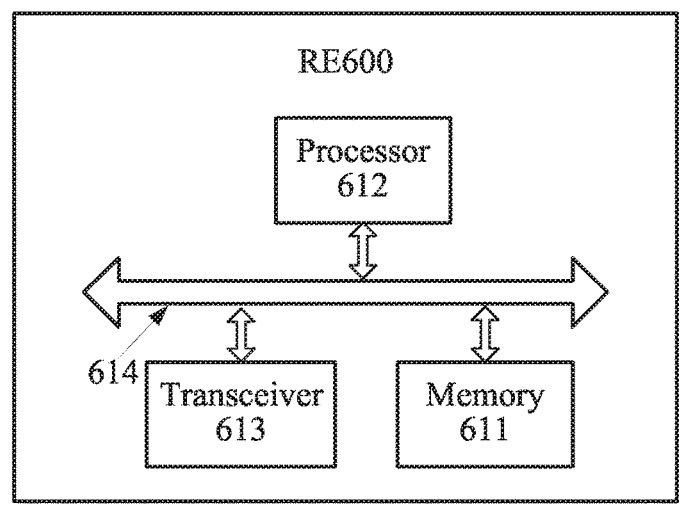
FIG. 12 is a schematic block diagram of an RE according to another embodiment of the present invention.

FIG. 12 is a schematic block diagram of an RE 600 according to an embodiment of the present invention. As shown in FIG. 12, the RE 600 includes a memory 611, a processor 612, a transceiver 613, and a bus 614. The memory 611, the processor 612, and the transceiver 613 are connected by using the bus 614, the memory 611 stores program code, and the processor 612 invokes the program code in the memory 611 to perform the following processing: controlling the transceiver 613 to receive, through a first port, an addressing request message sent by an REC, where the first port is an uplink CPRI port or a power cable port; determining, according to the addressing request message, that an object that the addressing request message is specific to includes the RE; and controlling the transceiver 613 to send, through the first port, a first addressing response message to the REC.

Optionally, the addressing request message carries information about a forwarding path from the REC to the RE 600; and before the transceiver 613 is controlled to send, through the first port, the first addressing response message to the REC, the processor invokes the program code in the memory to further perform the following processing: adding, to the first addressing response message, the information about the forwarding path from the REC to the RE 600, so that the first addressing response message is returned to the REC according to a reverse path of the addressing request message.

It should be understood that, in this embodiment of the present invention, the RE 600 may be an object that the addressing request message is uniquely specific to; in this case, the RE 600 may correspond to the RE 5 in Embodiment B, and can implement corresponding functions of the RE 5, and for brevity, details are not provided herein again.

Therefore, in this embodiment of the present invention, after an REC determines a main line used for communication with an RE is faulty, the REC may send an addressing request message specific to the RE, and determine, according to a path of an addressing response message returned by the RE, a standby line used for communication with the RE whose main line is faulty; therefore, when the main line is faulty, manual onsite processing is not required, a maintenance cost is reduced, and a service interruption time is reduced, thereby improving user experience.

It should be further understood that, in this embodiment of the present invention, the object that the addressing request message is specific to may further include another RE except the RE 600. For ease of understanding, this case is described in detail below with reference to Embodiment H.

Embodiment H

In this embodiment, the processor 612 invokes the program code in the memory 611 to further perform the following processing: determining, according to the addressing request message, that the object that the addressing request message is specific to further includes another RE; and when the first port is an uplink CPRI port, controlling the transceiver 613 to forward, through a downlink CPRI port and a power cable port, the addressing request message.

Optionally, before the transceiver 613 is controlled to forward, through the downlink CPRI port and the power cable port, the addressing request message, the processor 612 invokes the program code in the memory 611 to further perform the following processing: adding information about a forwarding path at the RE 600 to the addressing request message; and after the transceiver 613 is controlled to forward, through the downlink CPRI port and the power cable port, the addressing request message, the processor 612 invokes the program code in the memory 611 to further perform the following processing: controlling the transceiver 613 to receive, through the downlink CPRI port or through the power cable port, a second addressing response message, where the second addressing response message carries a message of the forwarding path at the RE 600; and forwarding the second addressing response message according to the information about the forwarding path at the RE 600.

Optionally, the processor 612 invokes the program code in the memory 611 to further perform the following processing: controlling the transceiver 613 to receive, through the downlink CPRI port or the power cable port, a second addressing response message; and controlling the transceiver 613 to forward, through an uplink CPRI port, the second addressing response message.

It should be understood that, in this embodiment of the present invention, the processor 612 may be a central processing unit (CPU for short), and the processor 612 may also be a general processor, a digital signal processor (DSP), an application specific integrated circuit (ASIC), a field programmable gate array (FPGA), another programmable logic device, a discrete gate, a transistor logic device, or a discrete hardware component. The general processor may be a microprocessor, or the processor may be any conventional processor.

The memory 611 may include a read-only memory and a random access memory, and provide an instruction and data for the processor 512. A part of the memory 611 may further include a non-volatile random access memory. For example, the memory 611 may further store information about a device type.

The bus system 614 includes not only a data bus, but also a power bus, a control bus, a state signal bus, and the like. However, for clear description, various buses are marked as the bus system 514 in the figure.

In an implementation process, the steps of the foregoing method can be completed by using an integrated logical circuit of hardware or an instruction in a software form in the processor 612. With reference to the embodiments of the present invention, the steps in the disclosed method may be directly completed by a hardware processor or completed by a combination of hardware and software modules in the processor. The software module may be located in a storage medium mature in the art, such as a random access memory, a flash memory, a read-only memory, a programmable read-only memory, an electrically erasable programmable memory, or a register. The storage medium is located in the memory 611, and the processor 612 reads information in the memory 611 and completes the steps of the foregoing method in combination with hardware thereof. To avoid repetition, details are not provided herein again.

Optionally, in this embodiment of the present invention, the processor 612 may include two sub processors, where one sub processor is configured to communicate with a BBU or another RE through a power cable, the other sub processor is configured to communicate with a BBU or another RE through a CPRI line, and these two sub processors are independent of each other, so that a possibility that a fault occurs in the two sub processors at the same time is relatively small; therefore, system performance can be greatly improved.

In Embodiment H, the RE 600 may correspond to any RE in the RE 1, the RE 2, the RE 3, the RE 4, and the RE 5 in Embodiment A, and can implement corresponding functions of the any RE, and for brevity, details are not provided herein again.

Therefore, in this embodiment of the present invention, an REC may send an addressing request message specific to all REs, determine, according to a path of an addressing response message returned by each RE, an RE whose main line is faulty, and determine a standby line used for communication with the RE whose main line is faulty; therefore, when the main line is faulty, manual onsite processing is not required, a maintenance cost is reduced, and a service interruption time is reduced, thereby improving user experience.

Figures 13, 14:
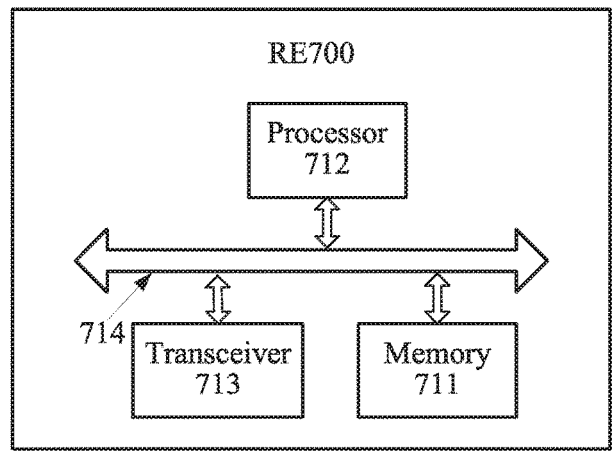
FIG. 13 is a schematic block diagram of an REC according to another embodiment of the present invention.
FIG. 14 is a schematic flowchart of an information transmission method according to another embodiment of the present invention.

FIG. 13 is a schematic block diagram of an RE 700 according to an embodiment of the present invention. As shown in FIG. 13, the RE 700 includes: a memory 711, a processor 712, a transceiver 713, and a bus 714. The memory 711, the processor 712, and the transceiver 713 are connected by using the bus 714, the memory 711 stores program code, and the processor 712 invokes the program code in the memory 711 to perform the following processing: controlling the transceiver 713 to receive, through a first port, an addressing request message sent by a radio equipment controller (REC); determining, according to the addressing request message, that an object that the addressing request message is specific to does not include the RE 700; and when the first port is an uplink CPRI port, controlling the transceiver 713 the forward, through a power cable port and a downlink CPRI port, the addressing request message.

Optionally, the processor 712 invokes the program code in the memory 711 to further perform the following processing: discarding the addressing request message when the first port is a power cable port.

Optionally, before the transceiver 713 is controlled to forward, through the power cable port and the downlink CPRI port, the addressing request message, the processor 712 invokes the program code in the memory 711 to further perform the following processing: adding information about a forwarding path at the RE 700 to the addressing request message; and after the transceiver 713 is controlled to forward, through the power cable port and the downlink CPRI port, the addressing request message, the processor 712 invokes the program code in the memory 711 to further perform the following processing: controlling the transceiver 713 to receive, through the downlink CPRI port or the power cable port, an addressing response message, where the addressing response message carries the information about the forwarding path at the RE 700; and forwarding the addressing response message according to the information about the forwarding path at the RE 700.

Optionally, after the transceiver 713 is controlled to forward, through the power cable port and the downlink CPRI port, the addressing request message, the processor 712 invokes the program code in the memory 711 to further perform the following processing: controlling the transceiver 713 to receive, through the downlink CPRI port or the power cable port, an addressing response message; and controlling the transceiver 713 to forward, through an uplink CPRI port, the addressing response message.

It should be understood that, in this embodiment of the present invention, the processor 712 may be a central processing unit (CPU for short), and the processor 712 may also be a general processor, a digital signal processor (DSP), an application specific integrated circuit (ASIC), a field programmable gate array (FPGA), another programmable logic device, a discrete gate, a transistor logic device, or a discrete hardware component. The general processor may be a microprocessor, or the processor may be any conventional processor.

The memory 711 may include a read-only memory and a random access memory, and provide an instruction and data for the processor 712. A part of the memory 711 may further include a non-volatile random access memory. For example, the memory 711 may further store information about a device type.

The bus system 714 includes not only a data bus, but also a power bus, a control bus, a state signal bus, and the like. However, for clear description, various buses are marked as the bus system 714 in the figure.

In an implementation process, the steps of the foregoing method can be completed by using an integrated logical circuit of hardware or an instruction in a software form in the processor 712. With reference to the embodiments of the present invention, the steps in the disclosed method may be directly completed by a hardware processor or completed by a combination of hardware and software modules in the processor. The software module may be located in a storage medium mature in the art, such as a random access memory, a flash memory, a read-only memory, a programmable read-only memory, an electrically erasable programmable read-only memory, or a register. The storage medium is located in the memory 711, and the processor 712 reads information in the memory 711 and completes the steps of the foregoing method in combination with hardware thereof. To avoid repetition, details are not provided herein again.

Optionally, in this embodiment of the present invention, the processor 712 may include two sub processors, where one sub processor is configured to communicate with a BBU or another RE through a power cable, the other sub processor is configured to communicate with a BBU or another RE through a CPRI line, and these two sub processors are independent of each other, so that a possibility that a fault occurs in the two sub processors at the same time is relatively small; therefore, system performance can be greatly improved.

Optionally, the RE 700 may correspond to any RE in the RE 1, the RE 2, the RE 3, and the RE 4 in Embodiment B, and can implement functions of the any RE, and for brevity, details are not provided herein again.

Therefore, in this embodiment of the present invention, after an REC determines a main line used for communication with an RE is faulty, the REC may send an addressing request message specific to the RE; when receiving the addressing request message, a non-target RE forwards the addressing request message; and when receiving the addressing request message, a target RE returns an addressing response message according to the addressing request message sent by the REC, so that the REC may determine according to a path of the addressing response message returned by the target RE, a standby line used for communication with the target RE whose main line is faulty; therefore, when the main line is faulty, manual onsite processing is not required, a maintenance cost is reduced, and a service interruption time is reduced, thereby improving user experience.

FIG. 14 is a schematic flowchart of an information transmission method 800 according to an embodiment of the present invention. As shown in FIG. 13, the method 800 includes.

S810: An REC determines that a main line used for communication with a first RE is faulty.

S820: The REC determines a standby line used for communication with the first RE.

S830: The REC communicates with the first RE by using the standby line.

Therefore, in this embodiment of the present invention, when an REC determines that a main line used for communication with any RE is faulty, the REC may determine a standby line used for communication with the RE whose main line is faulty, and communicate, by using the standby line, with the RE whose main line is faulty; therefore, when the main line is faulty, manual onsite processing is not required, a maintenance cost is reduced, and a service interruption time is reduced, thereby improving user experience.

In this embodiment of the present invention, the REC may be also referred to as a BBU, and the RE may be also referred to as an RRU.

In this embodiment of the present invention, the main line may be a CPRI communications line; and the standby line may be a power cable line, or be a power cable plus CPRI communications line. Certainly, the main line may be a power cable line, or be a power cable plus CPRI communications line; and the standby line is a CPRI communications line, or is in another manner, which may be specifically determined according to an application scenario, and are not limited by this embodiment of the present invention. However, in this embodiment of the present invention, that the main line is a CPRI communications line; and the standby line is a power cable line, or is a power cable plus CPRI communications line is mainly used for description.

Because the REC and the RE are inherently powered by a power cable network, in this embodiment of the present invention, when a fault occurs in the CPRI communications line between the REC and the RE, communication between the REC and the RE is implemented by using the power cable network of the REC and the RE.

In this embodiment of the present invention, the CPRI communications line refers to a line supporting the CPRI protocol; and the CPRI communications line may include at least one of an optical fiber, a coaxial cable, and an Ethernet cable.

In this embodiment of the present invention, in S830, the communicating, by the REC by using the standby line, with the first RE whose main line is faulty may include: sending, by the REC, indication information through the standby line, so as to reset or upgrade the first RE to recover the main line used by the REC to communicate with the first RE.

For example, a cause of the fault of the main line of the first RE is that an optical port parameter of the RE is improper; therefore, the optical port parameter of the RE may be modified through the standby line, so as to recover the main line.

For another example, a problem occurs in hardware of the RE; as a result, the RE cannot be normally started, and can only be recovered by performing power-on and power-off. Because, in this case, a problem already occurs in the RE, communication with the RE cannot be successfully performed by using the CPRI communications line. The standby line may be determined, where the standby line may include a power cable; and a communications unit 230 may send indication information to the RE through the standby line, to instruct the RE to perform power-on and power-off.

In this embodiment of the present invention, the REC may scan all controlled REs in real time (for example, periodically or at an initialization phase), determine, in all the REs, an RE whose main line is faulty, and determine a standby line of the RE whose main line is faulty; and the REC may also determine, by exchanging a heartbeat message with an RE, that a main line used for communication with the RE is faulty, and determine a standby line used for communication with the RE. For ease of understanding, the two cases are described in detail below with reference to Embodiment I and Embodiment K.

Embodiment I

The REC may scan all the controlled REs in real time (for example, periodically or at the initialization phase), determine, in all the REs, the RE (the first RE) whose main line is faulty, and determine the standby line of the RE whose main line is faulty.

Optionally, in S810, the determining, by an REC, that a main line used for communication with first RE is faulty includes: sending, by the REC, an addressing request message specific to all controlled REs through a CPRI port or through a power cable port and a CPRI port; receiving, by the REC, an addressing response message from at least one RE, where the at least one RE includes the first RE; and when a path of at least one addressing response message from the first RE does not include the main line, determining, by the REC, that the main line used for communication with the first RE is faulty; and in S820, the determining, by the REC, a standby line used for communication with the first RE includes: when the path of the at least one addressing response message from the first RE does not include the main line, determining, by the REC according to the path of the at least one addressing response message, the standby line used for communication with the first RE.

Optionally, the sending, by the REC, an addressing request message specific to all controlled REs through a CPRI port or through a power cable port and a CPRI port includes: when an RE that belongs to a same power cable network as the REC exists in all the REs, sending, by the REC, the addressing request message specific to all the REs through the CPRI port and the power cable port; or when an RE that belongs to a same power cable network as the REC does not exist in all the REs, sending, by the REC, the addressing request message specific to all the REs through the CPRI port or through the CPRI port and the power cable port.

Optionally, in S820, the determining, by the REC, a standby line used for communication with the first RE includes: determining, by the REC, that a path of an addressing response message received the first time from the first RE is the standby line used for communication with the first RE.

It should be understood that, the method in Embodiment I may be implemented by the REC in Embodiment A, an operation implemented by the REC in Embodiment A may belong to an optional embodiment of Embodiment I, and for brevity, details are not provided herein again.

Therefore, in this embodiment of the present invention, an REC may send an addressing request message specific to all REs, determine, according to a path of an addressing response message returned by each RE, an RE whose main line is faulty, and determine a standby line used for communication with the RE whose main line is faulty; therefore, when the main line is faulty, manual onsite processing is not required, a maintenance cost is reduced, and a service interruption time is reduced, thereby improving user experience.

Embodiment K

In this embodiment, after the REC determines, by exchanging a heartbeat message with the first RE, that the main line used for communication with the RE is faulty, the REC determines the standby line used for communication with the RE, and communicates with the first RE by using the standby line.

Optionally, in S820, the determining, by the REC, a standby line used for communication with the first RE includes: after the REC determines that the main line used for communication with the first RE is faulty, sending, by the REC, an addressing request message specific to the first RE through at least one of a power cable port and a CPRI port; receiving, by the REC, at least one addressing response message from the first RE; and determining, by the REC according to a path of the at least one addressing response message, the standby line used for communication with the first RE.

Optionally, the sending, by the REC, an addressing request message specific to the first RE through at least one of a power cable port and a CPRI port includes: when the REC and the first RE belong to a same power cable network, sending, by the REC, the addressing request message specific to the first RE through the power cable port or through the CPRI port and the power cable port; or when the REC and the first RE do not belong to a same power cable network, sending, by the REC, the addressing request message specific to the first RE through the CPRI port or through the CPRI port and the power cable port.

Optionally, in S830, the determining, by the REC, a standby line used for communication with the first RE includes: determining, by the REC, that a path of an addressing response message received the first time from the first RE is the standby line used for communication with the first RE.

It should be understood that, the method in Embodiment K may be implemented by the REC in Embodiment B, an operation implemented by the REC in Embodiment B may belong to an optional embodiment of Embodiment K, and for brevity, details are not provided herein again.

Therefore, in this embodiment of the present invention, after an REC determines a main line used for communication with an RE is faulty, the REC may send an addressing request message specific to the RE, and determine, according to a path of an addressing response message returned by the RE, a standby line used for communication with the RE whose main line is faulty; therefore, when the main line is faulty, manual onsite processing is not required, a maintenance cost is reduced, and a service interruption time is reduced, thereby improving user experience.

It should be understood that, in this embodiment of the present invention, that an REC and an RE belong to a same power cable network means that the REC and the RE can communicate only through a power cable. That the REC and the RE do not belong to a same power cable network means that the REC and the RE cannot communicate only through a power cable.

Therefore, in this embodiment of the present invention, when an REC determines that a main line used for communication with any RE is faulty, the REC may determine a standby line used for communication with the RE whose main line is faulty, and communicate, by using the standby line, with the RE whose main line is faulty; therefore, when the main line is faulty, manual onsite processing is not required, a maintenance cost is reduced, and a service interruption time is reduced, thereby improving user experience.

FIG. 15 is a schematic flowchart of an information transmission method 900 according to an embodiment of the present invention. As shown in FIG. 15, the method 900 includes.

S910: A first RE receives, through a first port, an addressing request message sent by an REC, where the first port is an uplink CPRI port or a power cable port.

S920: The first RE determines, according to the addressing request message, that an object that the addressing request message is specific to includes the first RE.

S930: The first RE sends a first addressing response message to the REC through the first port.

Optionally, the addressing request message carries information about a forwarding path from the REC to the first RE; and before the sending a first addressing response message to the REC through the first port, the method 900 further includes: adding, by the first RE to the first addressing response message, the information about the forwarding path from the REC to the first RE, so that the first addressing response message is returned to the REC according to a reverse path of the addressing request message.

It should be understood that, in this embodiment of the present invention, the first RE may be an object that the addressing request message is uniquely specific to; in this case, the method 900 may be implemented by the RE 5 in Embodiment B, that is, the first RE in the method 900 corresponds to the RE 5 in Embodiment B, an operation implemented by the RE 5 in Embodiment B may belong to an optional embodiment of the method 900, and for brevity, details are not provided herein again.

Therefore, in this embodiment of the present invention, after a base station determines a main line used for communication with an RE is faulty, an REC may send an addressing request message specific to the RE, and determine, according to a path of an addressing response message returned by the RE, a standby line used for communication with the RE whose main line is faulty; therefore, when the main line is faulty, manual onsite processing is not required, a maintenance cost is reduced, and a service interruption time is reduced, thereby improving user experience.

It should be further understood that, in this embodiment of the present invention, the object that the addressing request message is specific to may further include another RE except the first RE. For ease of understanding, this case is described in detail below with reference to Embodiment L.

Embodiment L

In this embodiment, the method 900 further includes: determining, by the first RE according to the addressing request message, that the object that the addressing request message is specific to further includes another RE; and forwarding, by the first RE, the addressing request message through a downlink CPRI port and a power cable port when the first port is an uplink CPRI port.

Optionally, before the forwarding the addressing request message through a downlink CPRI port and a power cable port, the method 900 further includes: adding information about a forwarding path at the first RE to the addressing request message; and after the forwarding the addressing request message through a downlink CPRI port and a power cable port, the method 900 further includes: receiving, by the first RE, a second addressing response message through the downlink CPRI port or through the power cable port, where the second addressing response message carries a message of the forwarding path at the first RE; and forwarding the second addressing response message according to the information about the forwarding path at the first RE.

Optionally, the method 900 further includes: receiving, by the first RE, a second addressing response message through the downlink CPRI port or the power cable port; and forwarding, by the first RE, the second addressing response message through an uplink CPRI port.

Optionally, the addressing request message carries information about a forwarding path from the REC to the first RE; and before the sending a first addressing response message to the REC through the first port, the method 900 further includes: adding, by the first RE to the first addressing response message, the information about the forwarding path from the REC to the first RE, so that the first addressing response message is returned to the REC according to a reverse path of the addressing request message.

Optionally, in Embodiment L, the first RE may correspond to any RE in Embodiment A; in this case, the method 900 may be implemented by the any RE in Embodiment A, an operation implemented by the any RE in Embodiment A may belong to an optional embodiment of the method 900, and for brevity, details are not provided herein again.

Therefore, in this embodiment of the present invention, an REC may send an addressing request message specific to all REs, determine, according to a path of an addressing response message returned by each RE, an RE whose main line is faulty, and determine a standby line used for communication with the RE whose main line is faulty; therefore, when the main line is faulty, manual onsite processing is not required, a maintenance cost is reduced, and a service interruption time is reduced, thereby improving user experience.

FIG. 16 is a schematic flowchart of an information transmission method 1000 according to an embodiment of the present invention. As shown in FIG. 16, the method 1000 includes.

S1100: A second RE receives, through a first port, an addressing request message sent by a REC.

S1200: Determine, according to the addressing request message, that an object that the addressing request message is specific to does not include the second RE.

S1300: The second RE forwards the addressing request message through a power cable port and a downlink CPRI port when the first port is an uplink CPRI port.

Optionally, the method 1000 further includes: discarding, by the second RE, the addressing request message when the first port is a power cable port.

Optionally, before the forwarding, by the second RE, the addressing request message through a power cable port and a downlink CPRI port, the method 1000 further includes: adding information about a forwarding path at the second RE to the addressing request message; and after the forwarding, by the second RE, the addressing request message through a power cable port and a downlink CPRI port, the method 1000 further includes: receiving, by the second RE, an addressing response message through the downlink CPRI port or the power cable port, where the addressing response message carries the information about the forwarding path at the second RE; and forwarding, by the second RE, the addressing response message according to the information about the forwarding path at the second RE.

Optionally, after the forwarding, by the second RE, the addressing request message through a power cable port and a downlink CPRI port, the method 1000 further includes: receiving, by the second RE, an addressing response message through the downlink CPRI port or the power cable port; and forwarding, by the second RE, the addressing response message through the uplink CPRI port.

Optionally, the second RE may correspond to any RE in the RE 1, the RE 2, the RE 3, and the RE 4 in Embodiment B, the method 1000 may be implemented by the any RE, an operation implemented by the any RE in Embodiment B may belong to an optional embodiment of the method 1000, and for brevity, details are not provided herein again.

Therefore, in this embodiment of the present invention, after an REC determines a main line used for communication with an RE is faulty, the REC may send an addressing request message specific to the RE; when receiving the addressing request message, a non-target RE forwards the addressing request message; and when receiving the addressing request message, a target RE returns an addressing response message according to the addressing request message sent by the REC, so that the REC may determine according to a path of the addressing response message returned by the target RE, a standby line used for communication with the target RE whose main line is faulty; therefore, when the main line is faulty, manual onsite processing is not required, a maintenance cost is reduced, and a service interruption time is reduced, thereby improving user experience.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided by this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present embodiments essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present embodiments, but are not intended to limit the protection scope of the present embodiments. Any variation or replacement readily figured out by a person skilled in the art within the technical scope disclosed in the present embodiments shall fall within the protection scope of the present embodiments. Therefore, the protection scope of the present embodiments shall be subject to the protection scope of the claims.

What is claimed is:

1. A radio equipment controller (REC), comprising:
a processor; and a non-transitory computer readable storage medium storing a program for execution by the processor, the program including instructions to:
send, through a power cable port or through a common public radio interface (CPRI) port, an addressing request message specific to a first radio equipment (RE);
receive at least one addressing response message from the first RE;
determine that a main line used by the REC to communicate with the first RE is faulty according to a path of an addressing response message sent by the first RE;
determine a standby line used by the REC to communicate with the first RE according to the path of the at least one addressing response message; and
communicate with the first RE using the standby line;
wherein the main line is a common public radio interface (CPRI) communications line, and wherein the standby line is a power cable line or a power cable plus CPRI communications line.

2. The REC according to claim 1, wherein the instructions further comprise instructions to:
send, through a CPRI port or through a power cable port and a CPRI port, an addressing request message specific to controlled REs;
receive an addressing response message from at least one RE, wherein the at least one RE comprises the first RE;
determine that the main line used for communication with the first RE is faulty, in response to a path of at least one addressing response message from the first RE not comprising the main line; and
determine, according to the path of the at least one addressing response message, the standby line used for communication with the first RE, in response to the path of the at least one addressing response message from the first RE not comprising the main line.

3. The REC according to claim 2, wherein the instructions further comprise instructions to:
send, through the CPRI port and the power cable port, the addressing request message specific to the controlled REs, in response to an RE that belongs to a same power cable network as the REC exists in the controlled REs; and
send, through the CPRI port or through the CPRI port and the power cable port, the addressing request message specific to the controlled REs, in response to an RE that belongs to a same power cable network as the REC does not exist in the controlled REs.

4. The REC according to claim 2, wherein the instructions further comprise instructions to:
determine that a path of an addressing response message received from the first RE is the standby line used for communication with the first RE.

5. The REC according to claim 1, wherein the instructions further comprise instructions to:
send, through the power cable port or through the CPRI port and the power cable port, the addressing request message specific to the first RE, in response to the REC and the first RE belonging to a same power cable network; and
send, through the CPRI port or through the CPRI port and the power cable port, the addressing request message specific to the first RE, in response to the REC and the first RE not belonging to a same power cable network.

6. A radio equipment (RE), comprising:
a processor; and
a non-transitory computer readable storage medium storing a program for execution by the processor, the program including instructions to:
receive, through a first port, an addressing request message sent by a radio equipment controller (REC), wherein the first port is an uplink common public radio interface (CPRI) port or a power cable port;
determine, according to the addressing request message, that an object that the addressing request message is specific to comprises the RE;
send a first addressing response message to the REC through the first port and with a path indicating whether a main line of the RE is faulty; and
determine, according to the addressing request message, that the object that the addressing request message is specific to further comprises another RE; and
forward, through a downlink CPRI port and a power cable port, the addressing request message, in response to the first port being the CPRI port and further in response to determining, according to the addressing request message, that the object to which the addressing request message is specific further comprises another RE.

7. The RE according to claim 6, wherein the instructions further comprise instructions to:
add information about a forwarding path at the RE to the addressing request message before forwarding the addressing request message;
receive, through the downlink CPRI port or through the power cable port, a second addressing response message, after forwarding the addressing request message, wherein the second addressing response message carries a message of the forwarding path at the RE; and
forward the second addressing response message according to the information about the forwarding path at the RE.

8. The RE according to claim 6, wherein the instructions further comprise instructions to:
receive, through the downlink CPRI port or the power cable port, a second addressing response message; and
forward, through an uplink CPRI port, the second addressing response message.

9. The RE according to claim 6, wherein the addressing request message carries information about a forwarding path from the REC to the RE, and wherein the instructions further comprise instructions to:
add, to the first addressing response message, the information about the forwarding path from the REC to the RE, so the first addressing response message is returned to the REC according to a reverse path of the addressing request message, before sending the first addressing response message to the REC.

10. A method, comprising:
sending, through a power cable port or through a common public radio interface (CPRI) port, an addressing request message specific to a first radio equipment (RE);
receive at least one addressing response message from the first RE;
determining, by a radio equipment controller (REC), that a main line used for communication with the first RE is faulty according to a path of an addressing response message sent by the first RE;
determining, by the REC, a standby line used for communication with the first RE according to the path of the at least one addressing response message; and communicating, by the REC with the first RE, using the standby line; and wherein the main line is a common public radio interface (CPRI) communications line, and wherein the standby line is a power cable line or a power cable plus CPRI communications line.

11. The method according to claim 10, wherein determining that the main line used for communication with the first RE is faulty comprises:
   sending, by the REC, an addressing request message specific to controlled REs through a CPRI port or through a power cable port and a CPRI port;
   receiving, by the REC, an addressing response message from at least one RE, wherein the at least one RE comprises the first RE; and
   determining, by the REC, that the main line used for communication with the first RE is faulty, in response to a path of at least one addressing response message from the first RE not comprising the main line; and
   wherein determining that the standby line used for communication with the first RE comprises determining, by the REC according to the path of the at least one addressing response message, the standby line used for communication with the first RE, in response to the path of the at least one addressing response message from the first RE not comprising the main line.

12. The method according to claim 11, wherein sending the addressing request message specific to the controlled REs comprises:
   sending, by the REC, the addressing request message specific to the controlled REs through the CPRI port and the power cable port, in response to an RE that belongs to a same power cable network as the REC existing in the controlled REs; and
   sending, by the REC, the addressing request message specific to the controlled REs through the CPRI port or through the CPRI port and the power cable port, in response to an RE that belongs to a same power cable network as the REC not existing in the controlled REs.

13. The method according to claim 11, wherein determining the standby line used for communication with the first RE comprises:
   determining, by the REC, that a path of an addressing response message received from the first RE is the standby line used for communication with the first RE.

14. The method according to claim 10, wherein sending the addressing request message specific to the first RE comprises:
   sending, by the REC, the addressing request message specific to the first RE through the power cable port or through the CPRI port and the power cable port, in response to the REC and the first RE belonging to a same power cable network; and
   sending, by the REC, the addressing request message specific to the first RE through the CPRI port or through the CPRI port and the power cable port, in response to the REC and the first RE not belonging to a same power cable network.

15. The method according to claim 10, wherein determining the standby line used for communication with the first RE comprises:
   determining, by the REC, that a path of an addressing response message received from the first RE is the standby line used for communication with the first RE.

* * * * *